(12) United States Patent
Tsubata et al.

(10) Patent No.: US 7,576,721 B2
(45) Date of Patent: Aug. 18, 2009

(54) DISPLAY DEVICE SUBSTRATE AND LIQUID CRYSTAL DISPLAY DEVICE HAVING THE SAME

(75) Inventors: Toshihide Tsubata, Mie (JP); Morihide Ohsaki, Mie (JP); Masanori Takeuchi, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/812,565

(22) Filed: Jun. 20, 2007

(65) Prior Publication Data

US 2007/0242063 A1   Oct. 18, 2007

Related U.S. Application Data

(63) Continuation of application No. 10/717,917, filed on Nov. 21, 2003.

(30) Foreign Application Priority Data

Dec. 27, 2002  (JP) .............................. 2002-381669
Oct. 31, 2003  (JP) .............................. 2003-372584

(51) Int. Cl.
 *G09G 3/36* (2006.01)
(52) U.S. Cl. .............................. 345/87; 349/84; 349/139
(58) Field of Classification Search .................. 345/55, 345/87, 204; 349/56, 84, 139–166
See application file for complete search history.

(56) References Cited

U.S. PATENT DOCUMENTS

| | | | |
|---|---|---|---|
| 5,446,562 A * | 8/1995 | Sato | 349/42 |
| 5,708,485 A | 1/1998 | Sato et al. | |
| 5,784,132 A | 7/1998 | Hashimoto | |
| 5,976,734 A | 11/1999 | Yamaguchi | |
| 6,157,433 A | 12/2000 | Kashimoto et al. | |
| 6,208,390 B1 | 3/2001 | Ejiri et al. | |
| 6,259,200 B1 * | 7/2001 | Morita et al. | 313/498 |
| 6,396,470 B1 | 5/2002 | Zhang et al. | |
| 6,476,896 B1 * | 11/2002 | Liu | 349/129 |

(Continued)

FOREIGN PATENT DOCUMENTS

JP   7-128685 A   5/1995

(Continued)

OTHER PUBLICATIONS

Korean Office Action and English translation thereof mailed Nov. 29, 2005 in corresponding Korean application No. 10-2003-0097307.

(Continued)

*Primary Examiner*—Amr Awad
*Assistant Examiner*—Stephen G Sherman
(74) *Attorney, Agent, or Firm*—Nixon & Vanderhye, P.C.

(57) ABSTRACT

The display device substrate according to the present invention is arranged so that: a source line is provided on an area on which a pixel electrode is not provided, and a gap is provided between the source line and the pixel electrode, and a black matrix (light shielding film) which covers a surface of the source line overlaps with the pixel electrode. Thus, it is possible to prevent parasitic capacitance (Csd) between the pixel electrode and the source line from becoming uneven in a display area, so that it is possible to reduce display unevenness of a liquid crystal display device using the present display device substrate.

13 Claims, 15 Drawing Sheets

U.S. PATENT DOCUMENTS

| | | | |
|---|---|---|---|
| 6,674,093 | B1 | 1/2004 | Tanaka et al. |
| 6,724,443 | B1 | 4/2004 | Sano et al. |
| 2001/0026342 | A1 | 10/2001 | Ejiri et al. |
| 2002/0067448 | A1 | 6/2002 | Kim et al. |
| 2004/0084672 | A1 | 5/2004 | Tanaka et al. |

FOREIGN PATENT DOCUMENTS

| | | | | |
|---|---|---|---|---|
| JP | 10-39292 | A | | 2/1998 |
| JP | 10-170957 | A | | 6/1998 |
| JP | 11-52353 | A | | 2/1999 |
| JP | 11-119251 | A | | 4/1999 |
| JP | 2001-33816 | A | | 2/2001 |
| JP | 2001-125139 | A | | 5/2001 |
| JP | 2001-196595 | A | | 7/2001 |
| JP | 2002-116712 | A | | 4/2002 |
| JP | 2002221726 | A | * | 8/2002 |
| KR | 1996-0015020 | | | 5/1996 |
| KR | 1996-0035088 | | | 10/1996 |
| KR | 1998-0038039 | | | 8/1998 |

OTHER PUBLICATIONS

U.S. Office Action mailed May 13, 2008 in corresponding U.S. Appl. No. 11/812,564.

U.S. Final Office Action mailed Mar. 10, 2009 in related U.S. Appl. No. 10/717,917.

* cited by examiner

RELATIONSHIP BETWEEN PIXEL
ELECTRODE-SOURCE LINE DISTANCE AND ΔΔβ

S1, S2, AND S3 ... SOURCE LINE

DISPLAY DEVICE SUBSTRATE AND LIQUID CRYSTAL DISPLAY DEVICE HAVING THE SAME

This application is a continuation of U.S. patent application Ser. No. 10/717,917 which claims priority of JP application 2002-381669 filed Dec. 27, 2002 and JP application 2003-372584 filed Oct. 31, 2003, both of which are incorporated herein by reference in their entirety.

FIELD OF THE INVENTION

The present invention relates to a display device substrate which can improve display quality of a display device and to a liquid crystal display device having the display device substrate.

BACKGROUND OF THE INVENTION

A liquid crystal display device nowadays has characteristics such as small size, thinness, low power consumption, and light weight, and is widely used in various kinds of electronic devices. Particularly, an active matrix type liquid crystal display device (liquid crystal panel) having a switching element as an active element can realize the same display property as in a CRT, so that this is widely applied to an OA device such as a personal computer, an AV device such as a television, a cellular phone, and the like. Further, recently, the liquid crystal display device has been being made larger and finer, and its quality (such as an effective pixel area ratio (aperture ratio)) has improved rapidly.

In a technique wherein a pixel electrode and a source line (signal line) are formed in the same surface of an active matrix substrate, a distance between the pixel and a source bus line (hereinafter, referred to simply as a source line) is shortened and the source line is made finer so as to increase the effective pixel area, thereby making the device finer and improving the aperture ratio.

However, when the distance between the pixel and the source line is shortened, a short circuit tends to occur. Further, when the source line is made finer, connection failure tends to occur. In such a technique wherein a pixel electrode and a source line are formed in the same surface of an active matrix substrate, the tendency to short circuiting and connection failure decrease production yield.

To prevent short circuiting and the connection failure, and resultant production yield, methods (a) to (c) of manufacturing the active matrix substrate have been proposed.

(a) After forming the active element and the source line, a transparent interlayer insulating film is provided.

(b) The active element and a transparent pixel electrode are made to contact each other via a contact hole.

(c) A pixel electrode is formed on the transparent interlayer insulating film so that the source line and the pixel electrode are separately positioned on different planes.

Further, a color filter substrate is combined with the active matrix substrate manufactured in the foregoing manner so that the color filter substrate faces the active matrix substrate, and liquid crystal is injected into a gap between both the substrates, thereby obtaining the liquid crystal display device. An example color filter substrate includes a color substrate having areas of R (red), G (green), and B (blue), so that these areas correspond to pixel areas on the side of the active matrix substrate wherein a black matrix (light shielding film) is provided on an area other than the pixel areas.

In the manufacturing method of the liquid crystal display device using the foregoing color filter, accuracy in forming the black matrix (hereinafter, referred to as "BM" as required) has influence on the aperture ratio. The accuracy in forming the BM is calculated by adding (i) accuracy in combining the active matrix substrate with the color filter substrate to (ii) accuracy in forming a desired width of the BM. In order to solve the problem, Japanese Unexamined Patent Publication No. 170957/1998 (Tokukaihei 10-170905)(publication date: Jun. 26, 1998) and Japanese Unexamined Patent Publication No. 33816/2001 (Tokukai 2001-33816)(Publication date: Feb. 9, 2001) recite such technique that the BM is formed on the side of the active matrix substrate in a self-aligning manner so as to improve the aperture ratio.

The following description will explain a specific example of the active matrix substrate, on which the BM is formed in a self-aligning manner, with reference to FIG. 12 and FIG. 13.

FIG. 12 is a plan view showing a pixel of a conventional active matrix substrate (thin film transistor array) and a part of a pixel adjacent to that pixel. As shown in FIG. 12, a gate bus line (scanning line: hereinafter, referred to merely as a gate line) 101 and a source bus line (signal line: hereinafter, referred to merely as a source line) 102 are disposed so as to cross each other in the pixel of the conventional active matrix substrate. In the intersection area, a pixel electrode 103 is disposed.

On the gate line 101, a gate electrode 104 is provided. On the source line 102, a source electrode 105 is provided. Further, the pixel electrode 103 is connected to the drain electrode 106. Further, a pixel electrode 103' having the same function as the pixel electrode 103 is provided on a pixel adjacent to the pixel having the pixel electrode 103. The source line 102 is provided between the pixel electrode 103 and the pixel electrode 103'.

A drain electrode 106 is connected to the pixel electrode 103 via a contact hole 109. Likewise, an auxiliary capacitor bus line (hereinafter, referred to merely as an auxiliary capacitor line) 107 is connected to the pixel electrode 103 via a contact hole 109'.

The following description will briefly explain a method of manufacturing the active matrix substrate, particularly a method of manufacturing a thin film transistor array, with reference to FIG. 12 and FIG. 13. Note that, FIG. 13 is a cross sectional view taken along A-A' line of the thin film transistor array shown in FIG. 12.

First, the gate line 101, the gate electrode 104, and the auxiliary capacitor line 107 are formed on a substrate 110, constituted of a transparent insulating substrate made of glass and the like, in accordance with the same process. Next, a gate insulating film 111 is formed thereon.

Thereafter, an active element 114 such as a thin film transistor (TFT) is formed. In FIG. 12 and FIG. 13, first, an active semiconductor layer 112 is formed. Next, an amorphous silicon (for example, an n-type amorphous silicon) layer 113 is formed. Further, the source line 102, the source electrode 105, and the drain electrode 106 are formed (the source line 102 and the source electrode 105 are formed in accordance with the same process).

Next, the BM 108 constituted of an insulating layer pattern is formed so as to cover the active element 114 (except for the contact hole 109 and its peripheral portion), the source line 102, and the gate line 101, and the auxiliary capacitor line 107 (except for the contact hole 109' and its peripheral portion).

The black matrix 108 is provided on areas of the components other than the pixel electrode in a self-aligning manner. The BM 108 is formed in a self-aligning manner so as to correspond to the gate line 101, the source line 102, the active element 114, and the auxiliary capacitor line 107, by exposing a back side of the substrate 110.

Thereafter, the interlayer insulating film 115 is formed so as to cover whole the surface. Next, the contact hole 109 and the contact hole 109' are formed. Next, the pixel electrodes 103 and 103' are formed so as to coat the contact holes 109 and 109'. Note that, the contact hole 109 enables the drain electrode 106 and the pixel electrode 103 of the active element to be connected to each other. Further, the contact hole 109' enables the auxiliary capacitor line 107 for generating auxiliary capacitance and the pixel electrode 103 to be connected to each other.

According to the manufacturing method, in the active matrix substrate, it is possible to separate the source line 102 from the pixel electrode 103 with the interlayer insulating film 115 therebetween.

By separating the source line from the pixel electrode, it is possible to make the pixel electrode (103/103') and the source line 102 overlap with each other as shown in FIG. 13. In a conventional technique, the aperture ratio of the liquid crystal display device is improved by (i) making the pixel electrode and the source line overlap with each other and (ii) forming the minimum BM pattern in a self-aligning manner.

How the pixel electrode and the source line overlap with each other is described as follows with reference to FIG. 13. Each of (z) and (z') that are shown in FIG. 12 and FIG. 13 represents a distance of a portion in which the source line 102 overlaps with the pixel electrode 103 or 103'. Further, in FIG. 13, z is a distance between z1 and z2. Likewise, z' is a distance between z1' and z2'.

The z1 represents where an end of the source line 102 is positioned, and is a line which extends from the end of the source line 102 in perpendicular to a surface of the source line 102. Likewise, the z1' represents where an end of the source line 102 is positioned, and is a line which extends from the end of the source line 102 in perpendicular to a surface of the source line 102. Z1 is an end close to a pixel electrode (103') adjacent to a target pixel. The z1' is an end close to a pixel electrode (103) of the target pixel.

z2 represents where an end of the pixel electrode 103' is positioned, and is a line which extends from the end of the pixel electrode 103' in perpendicular to a surface of the pixel electrode 103'. Likewise, z2' represents where an end of the pixel electrode 103 is positioned, and is a line which extends from the end of the pixel electrode 103 in perpendicular to a surface of the pixel electrode 103.

However, according to the manufacturing method of the substrate, parasitic capacitance (Csd) between the pixel electrode and the source line varies in a display area. The variation brings about an in-plane difference in electric charge retained in a liquid crystal capacitor of each pixel. The in-plane difference causes display unevenness of the liquid crystal display device.

Such problem results from such condition that: unevenness in the exposure accuracy is brought about in a photolithograph process, and the unevenness causes a positional relationship between the source line pattern and the pixel electrode pattern to vary in the display area. In manufacturing the active matrix, alignment accuracy between a light-emitted portion and a light-non-emitted portion in the lithography process is generally about ±0.3 μm.

BRIEF SUMMARY

The object of the present invention is to provide a display device substrate which can reduce display unevenness of a display device, particularly a liquid crystal display device.

In order to achieve the foregoing object, the display device substrate according to the present invention includes: one or more pixel electrodes each of which is provided on each intersection of a signal line and a scanning line that are provided on an insulating substrate; and an interlayer insulating film stacked between the signal line and the pixel electrode, wherein in view of a vertical direction with respect to a surface of the insulating substrate, the signal line is provided on an area on which the pixel electrode is not provided, and a gap is provided between the signal line and the pixel electrode.

According to the arrangement, in view of a vertical direction with respect to a surface of the insulating substrate, a gap is provided between the signal line (source line) and the pixel electrode. When a gap is provided between the signal line (source line) and the pixel electrode in this manner, a value $(\Delta\Delta\beta)$ interrelated with display unevenness of the display device is reduced. When $\Delta\Delta\beta$ is reduced, difference in a pixel potential effective value (Vd) is reduced. As a result, it is possible to reduce the display unevenness of the display device.

Further, the liquid crystal display device of the present invention includes the display device substrate according to the present invention.

According to the arrangement, the display device substrate provided in the liquid crystal display device is such that: in view of a vertical direction with respect to a surface of the insulating substrate, the signal line is provided on an area on which the pixel electrode is not provided, and a gap is provided between the signal line and the pixel electrode. In this manner, a gap is provided between the signal line and the pixel electrode, so that a value $(\Delta\Delta\beta)$ interrelated with display unevenness of the display device is reduced. When $\Delta\Delta\beta$ is reduced, difference in a pixel potential effective value (Vd) is reduced. Thus, according to the arrangement, it is possible to provide a liquid crystal display device which can reduce the display unevenness of the display device.

For a fuller understanding of the nature and advantages, reference should be made to the ensuing detailed description taken in conjunction with the accompanying drawings.

DESCRIPTION OF THE EMBODIMENTS

Embodiment 1

Figure 1:
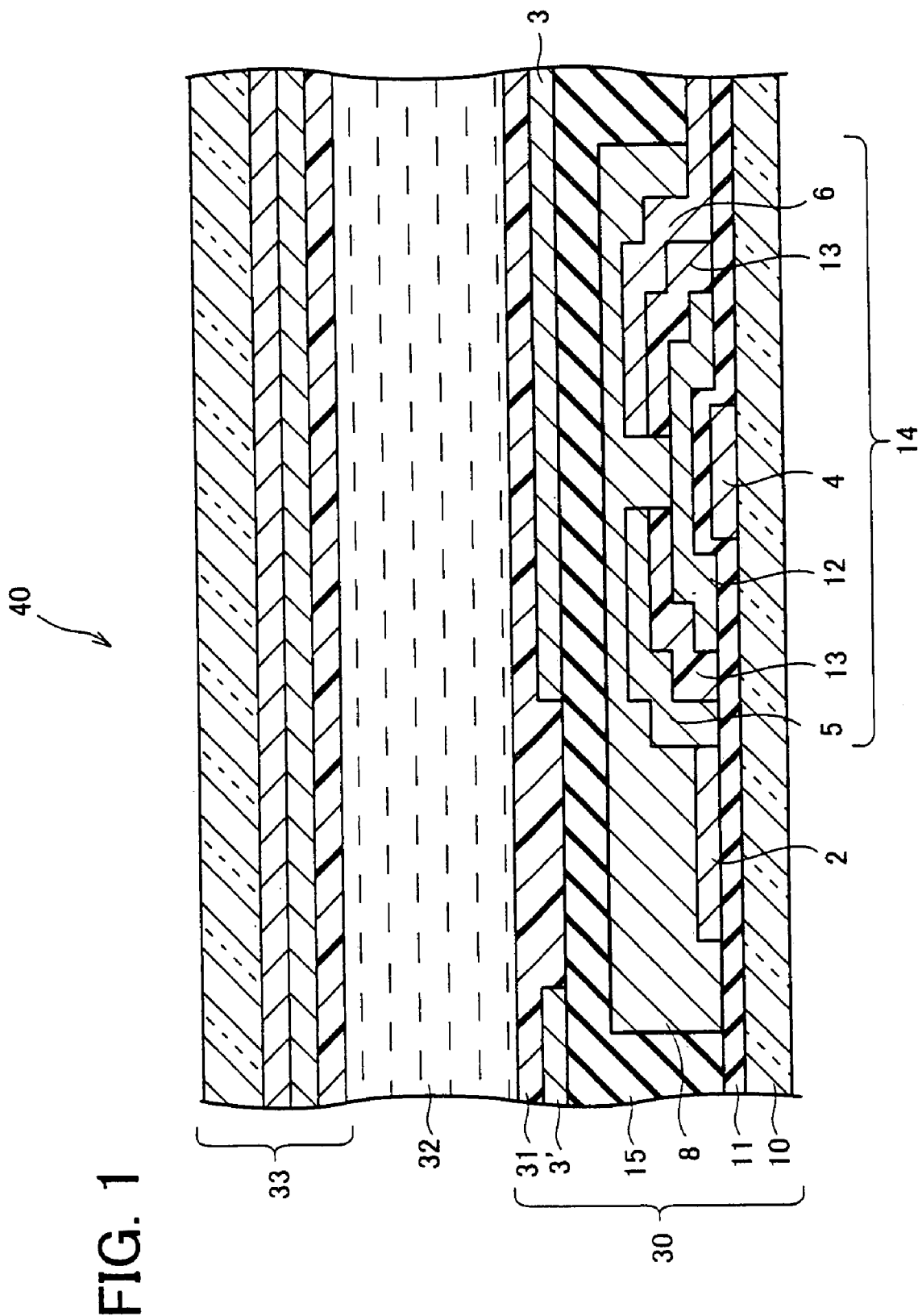
FIG. 1 is a cross sectional view showing an example embodiment of a liquid crystal display device.
Figure 2:
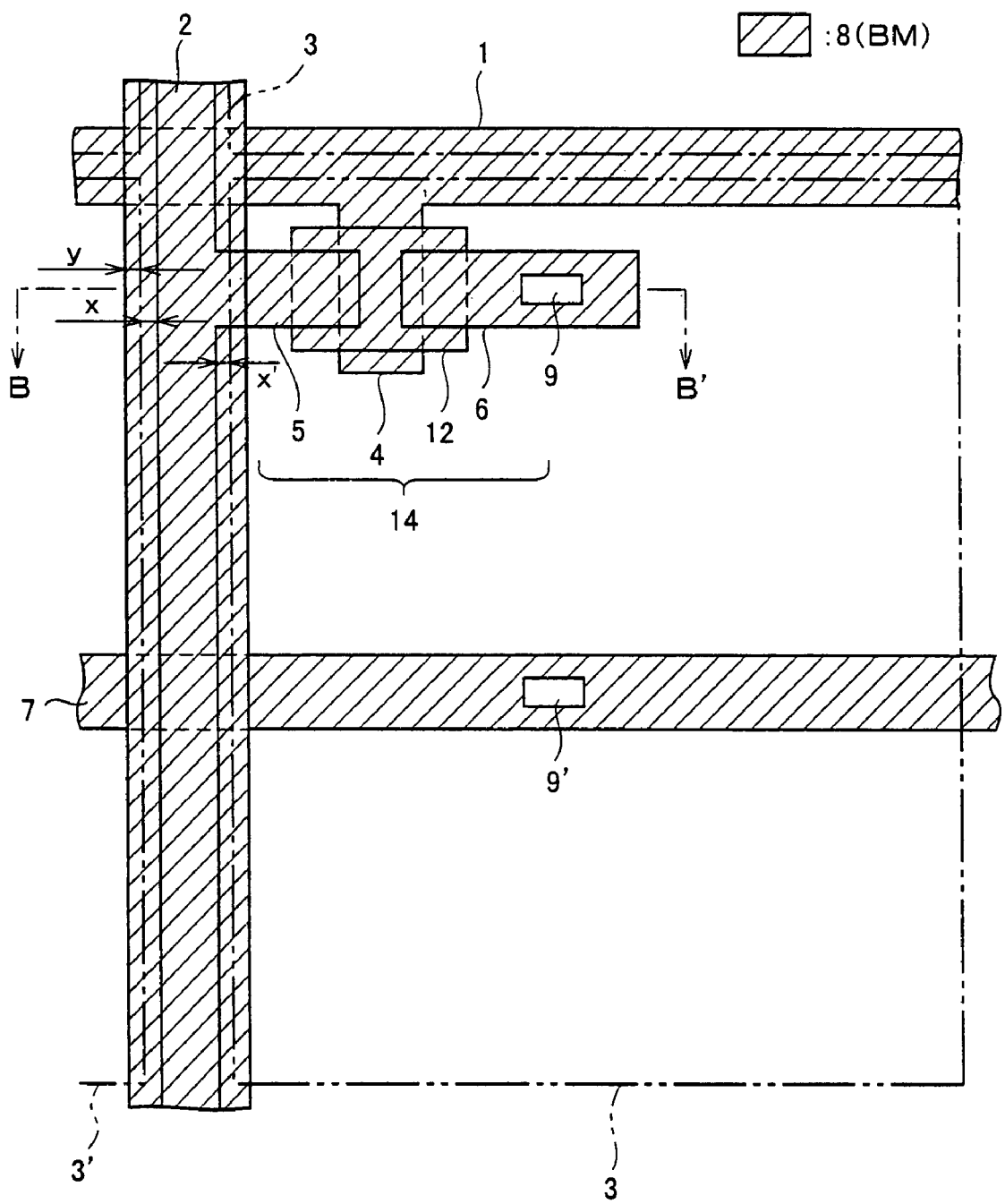
FIG. 2 is a plan view showing an embodiment of a display device substrate.
Figure 3:
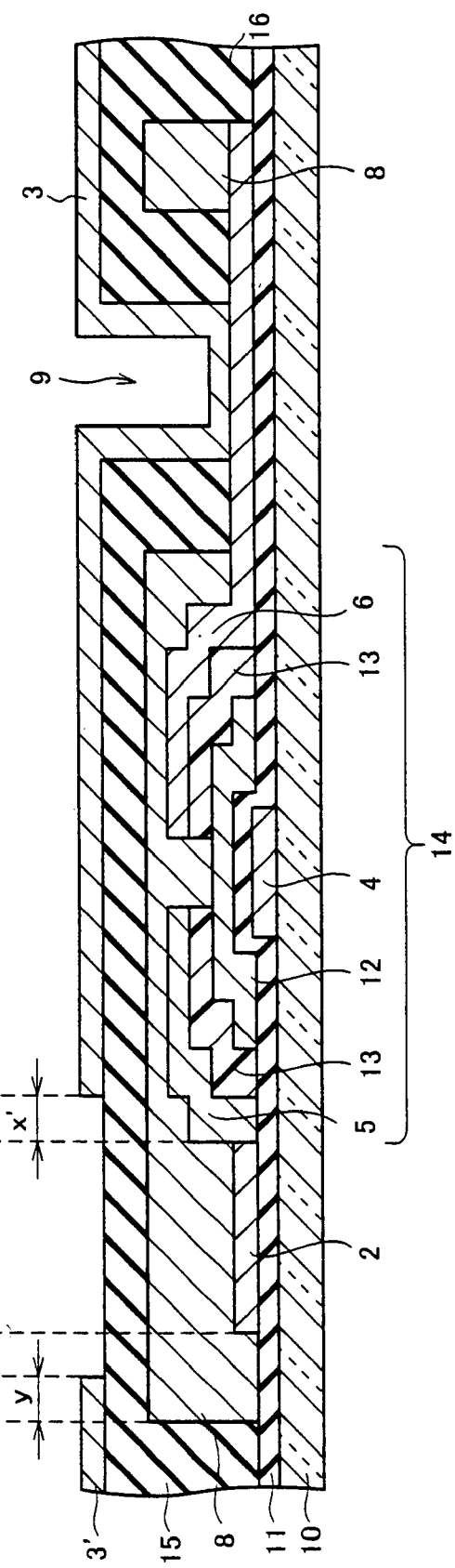
FIG. 3 is a cross sectional view taken along B-B' line of the display device substrate shown in FIG. 2.

The following description will explain one embodiment of the present invention with reference to FIG. 1 to FIG. 3.

The present embodiment will explain an active matrix substrate for a liquid crystal display device as a specific example of the display device substrate.

FIG. 1 is a cross sectional view showing an example embodiment of the liquid crystal display device. A liquid crystal display device 40 includes an active matrix substrate 30 and a counter substrate 33, and a liquid crystal layer 32 is sandwiched by these substrates. Liquid crystal layer 32 is sandwiched by an alignment film of the counter substrate 33 and an alignment film 31 of the active matrix substrate 30.

FIG. 2 is a plan view showing (i) a single pixel in the active matrix substrate 30 (display device substrate) of the present invention and (ii) a part of a pixel adjacent to the single pixel. As shown in FIG. 2, a source line (signal line) 2, a gate line (scanning line) 1, and a pixel electrode 3 are stacked above an insulating substrate 10. The gate line 1 and the source line 2 are disposed so as to cross each other. Further, the pixel electrode 3 is disposed in each intersection where the gate line 1 and the source line 2 cross each other. The insulating substrate 10 is positioned on the backmost side in FIG. 2, and is positioned as shown in the cross sectional view of FIG. 3.

The gate line 1 has a gate electrode 4. The source line 2 has a source electrode 5. Further, the pixel electrode 3 is connected to a drain electrode 6. Further, a pixel electrode 3' having the same function as the pixel electrode 3 is provided on a pixel adjacent to the pixel having the pixel electrode 3. The source line 2 is provided between the pixel electrode 3 and the pixel electrode 3'.

The drain electrode 6 is connected to the pixel electrode 3 via a contact hole 9. Likewise, an auxiliary capacitor bus line (hereinafter, referred to merely as an auxiliary capacitor line) 7 is connected to the pixel electrode 3 via a contact hole 9'.

As shown in FIG. 2, a black matrix (hereinafter, referred to as BM)(light shielding film) 8 is provided so as to cover an active element 14, the gate line 1, and the source line 2. Further, FIG. 2 shows that: in view of a vertical direction with respect to a surface of the insulating substrate 10, the BM 8 covering a surface of the source line 2 overlaps with the pixel electrode 3. Likewise, the pixel electrode 3' and the BM 8 overlap with each other. That is, the BM 8 which covers a surface of the signal line in a specific pixel and the pixel electrode 3' positioned adjacent to the specific pixel with the signal line therebetween overlap with each other. In FIG. 2, a width (distance) of a portion where the pixel electrode 3' and the BM 8 overlap with each other is shown by y.

Further, as shown in FIG. 2, when in view of a vertical direction with respect to the surface of the insulating substrate 10, the source line is positioned in an area having no pixel electrode, that is, an area between the pixel electrode 3 and the pixel electrode 3'. Further, a gap (x) is provided between the source line 2 and the pixel electrode 3'. Likewise, in view of a vertical direction with respect to the surface of the insulating substrate 10, a gap (x') is provided between the source line 2 and the pixel electrode 3.

As used herein, "in view of a vertical direction with respect to the surface of the insulating substrate 10" means that "in view of an orthogonal projection of a target object disposed on the surface of the insulating substrate 10". More specifically, the "view" is obtained by linking ends of lines which are perpendicularly extended from a target object to the surface of the insulating substrate 10".

For example, "the pixel electrode 3' and the BM 8 overlap with each other" means that (i) an orthogonal projection of the pixel electrode 3' disposed above the surface of the insulating substrate 10 and (ii) an orthogonal projection of the BM 8 disposed above the surface of the insulating substrate 10 overlap with each other. Further, the gap (x) provided between the source line 2 and the pixel electrode 3' is a gap positioned between (i) an orthogonal projection of the source line 2 disposed above the surface of the insulating substrate 10 and (ii) an orthogonal projection of the pixel electrode 3' disposed above the surface of the insulating substrate 10.

Further, "a gap (x'·x) is provided between the source line 2 and the pixel electrode 3 or 3'" means that the liquid crystal layer 32 has an area, to which a voltage is not applied from the pixel electrodes 3 or 3', between the pixel electrode and the signal line when a voltage is applied to the pixel electrode 3 and 3'.

How a current and a voltage are controlled will be briefly explained. When the gate line 1 is selected, a voltage is applied to the gate electrode 4. The voltage applied to the gate electrode 4 controls a current flowing between the source electrode 5 and the drain electrode 6. That is, a current flows from the source electrode 5 via the drain electrode 6 to the pixel electrode 3 on the basis of a signal transmitted from the source line 2, so that the pixel electrode 3 makes a predetermined display. The auxiliary capacitor line 7 is subsidiarily provided so as to maintain the predetermined display.

A process of manufacturing the active matrix substrate 30 is next explained as follows with reference to FIG. 2 and FIG. 3. FIG. 3 is a cross sectional view taken along B-B' shown in FIG. 2.

First, the gate line 1, the gate electrode 4, and the auxiliary capacitor line 7 are formed on the insulating substrate 10 constituted of a transparent insulator made of glass and the like in accordance with the same process. Next, a gate insulating film 11 is formed on a surface thereof. Next, an active element 14 such as a thin film transistor (TFT), the source line 2, and the source electrode 5 are formed. The source line 2 and the source electrode 5 are formed in accordance with the same process.

The active element 14 shown in FIG. 2 and FIG. 3 is formed as follows. First, an active semiconductor layer 12 is formed. Next, an amorphous silicon (for example, an n-type amorphous silicon) layer 13 is formed. Further, the source line 2, the source electrode 5, and the drain electrode 6 are formed (the source line 2 and the source electrode 5 are formed in accordance with the same process).

Then, the BM (BM pattern) 8 is formed after forming the active element 14, the source line 2, and the source electrode 5. The BM 8 can be formed by using an insulating layer pattern, made of resin, which has a light shielding property for example. As an example of material for the BM, it is possible to use a photosensitive resin material, based on a dry film laminate process, in which carbon is dispersed.

A process of forming the BM 8 is as follows. First, a dry film having a black resin film is laminated on a surface of the substrate, and the black resin film is transcribed by exfoliating a cover film. Next, exposure, development, and post-bake are performed by using a pattern mask so as to cover the drain electrode 6, the source electrode 5, the active element 14, the source line 2, the gate line 1, and the auxiliary capacitor line 7, and so that the pixel electrode 3 and the pixel electrode 3' overlap with BM 8 in a two-dimensional manner (overlapping portion is shown by "y" of FIG. 3), thereby forming the BM 8 (BM pattern). As shown in FIG. 2 and FIG. 3, the BM 8 is not formed on the contact holes 9 and 9' and peripheral portions thereof.

Next, an interlayer insulating film 15 is formed so as to cover whole the surface of the insulating substrate 10 having the BM 8. As an example of a material for the interlayer insulating film 15, it is possible to use a negative photosensitive transparent resin. Specific examples of the negative photosensitive transparent resin include acrylic resin, epoxy resin, polyurethane resin, and polyimide resin. However, the material for the interlayer insulating film 15 is not limited to the resin, but as the material for the interlayer insulating film 15, it is possible to use a material, such as $SiN_x$ film (silicon nitride film) based on a CVD (Chemical Vapor Deposition) process, which brings about desired dielectric constant and transmittance.

Next, there is formed the contact hole 9, which connects (i) the drain electrode 6 of the active element 14 and (ii) the pixel electrode 3 to each other, and there is formed the contact hole 9' which connects the auxiliary capacitor line 7 for generating auxiliary capacitance to the pixel electrode 3. Thereafter, a transparent pixel electrode is formed so as to coat the contact holes 9 and 9'. Next, patterning is performed with respect to the transparent pixel electrode so as to provide a two-dimensional distance x away from the source line 2, thereby obtaining the pixel electrodes 3 and 3'.

In the present embodiment, aluminium (Al) is used as a material for the gate line 1 and the source line 2. However, as long as a desired line resistance is obtained, any metal can be used as the material for the gate line 1 and the source line 2. For example, it is also possible to use metals such as tantalum (Ta), titanium (Ti), chromium (Cr), and the like, and an alloy thereof, as the material for the gate line 1 and the source line 2. Further, it is also possible to use a film, in which TaN/Ta/TaN and Ti/Al/Ti, and the like, are staked, as the material for the gate line 1 and the source line 2. Further, it is possible to use not only a general metal film but also a transparent conductive film such as ITO (Indium Tin Oxide) for example, as the material for the source line 2.

Further, in the present embodiment, the amorphous silicon thin film transistor is used as the active element (switching element) 14. However, as the switching element, it is possible to use a micro crystal silicon thin film transistor, a polysilicon thin film transistor, a CGC (continuous grain crystalline silicon) thin film transistor, an MIM (Metal Insulator Metal), and the like, in a similar manner.

As the resin layer of the BM 8, a transer film type photosensitive resin material, having an OD value of 3.0 and a film thickness of 2.5 μm, in which carbon is dispersed, is used. However, the material is not limited to such resin material, but it is also possible to use other material which brings about desired OD value, taper shape, and dielectric constant. As the material for the BM 8, it is possible to use pigment dispersion type black resist and the like for example. Note that, the OD is an abbreviation of "Optical Density". Further, the OD value represents a transmittance of a material. The larger the OD value of the material is, the smaller the transmittance is.

Further, ITO is used as the pixel electrodes 3 and 3', but it is also possible to use a transparent pixel electrode such as IZO (Indium Zinc Oxide) as the pixel electrodes 3 and 3'.

Further, in the present embodiment, the BM 8 is provided so as to cover the drain electrode 6, the source electrode 5, the active element 14, the source line 2, the gate line 1, and the auxiliary capacitor line 7, and so as to overlap with the pixel electrodes 3 and 3', but the arrangement is not limited to this. The BM 8 may arranged so that at least the surface of the source line 2 is covered. In this case, it is preferable to arrange the BM 8 as follows: as shown in FIG. 2, in view of a vertical direction with respect to the surface of the insulating substrate 10, a gap is provided between the source line 2 and each of the pixel electrodes 3 and 3', and the BM 8 covers a gap between the pixel electrodes 3 and 3' adjacent to each other, i.e., a gap between the pixel electrodes 3 and 3' adjacent to each other with the source line 2 therebetween, and the BM 8 which covers the surface of the source line 2 overlaps with the pixel electrodes 3 and 3' (however, it may be so arranged that they do not overlap with each other).

In the case where the BM8 and the pixel electrodes 3 and 3' overlap with each other, even when deviation occurs in the alignment in patterning the BM8 by using photolithography or the like, it is possible to prevent the light leakage without fail.

That is, it may be so arranged that: the BM 8 covers at least the surface of the source line 2 among the drain electrode 6, the source electrode 5, the active element 14, the source line 2, the gate line 1, and the auxiliary capacitor line 7, so that it is possible to suppress, preferably prevent light leakage. It may be so arranged that the BM 8 is provided so as to cover at least the surface of the source line 2, but it is preferable to provide the BM 8 so as to cover also a surface of the active element 14, and it is more preferable to provide the BM 8 so as to cover also a surface of the gate line 1.

Next, the width y of the overlapping portion, the gaps x and x' that are shown in FIG. 2 are explained as follows with reference to FIG. 3. x1' shown in FIG. 3 is a straight line which vertically extends from an end of the pixel electrode 3 (an end portion positioned on the side where the source electrode 5 and the source line 2 are formed) to the surface of the insulating substrate 10. x2' is a straight line which vertically extends from an end of the insulating source line 2 (an end portion positioned on the side of the active element (switching element) 14) to the surface of the insulating substrate 10. x' is a distance (shortest distance) between both the lines of x1' and x2'. That is, this shows that: the gap x' is provided between the end of the source line 2 (an end portion positioned on the side of the active element (switching element) 14) and the end of the pixel electrode 3 (an end portion positioned on the side where the source electrode 5 and the source line 2 are formed), that is, between an orthogonal projection of the pixel electrode and an orthogonal projection of the source line 2. In other words, x' is equal to a distance between (i) a vertical plane, having an end face of the pixel electrode 3 (an end face positioned on the side where the source electrode 5 and the source line 2 are formed), which is perpendicular to the surface of the insulating substrate 10 and (ii) a vertical plane, having an end face of the source line 2 (an end face positioned on the side of the active element (switching element) 14), which is perpendicular to the surface of the insulating substrate 10.

Further, x1 shown in FIG. 3 is a straight light which vertically extends from an end of the pixel electrode 3' (an end portion positioned on the side of the source line, that is, positioned opposite to the end of the pixel electrode 3) to the surface of the insulating substrate 10. x2 is a straight line which vertically extends from another end of the source line 2 (another end portion positioned on the side of the pixel electrode 3') to the surface of the insulating substrate 10. Further, x is a distance (shortest distance) between both the lines of x1 and x2. That is, this shows that: the gap x is provided between (i) the pixel electrode 3' adjacent to the pixel electrode 3 with the source line 2 therebetween and (ii) the source line 2, that is, between an orthogonal projection of the source line 2 and an orthogonal projection of the pixel electrode 3. In other words, x is equal to a distance (shortest distance) between (i) a vertical plane, having an end face of the pixel electrode 3' (an end face positioned on the side of the source line, that is, positioned opposite to the end face of the pixel electrode 3), which is perpendicular to the surface of the insulating substrate 10 and (ii) a vertical plane, having an end face of the source line 2 (an end face positioned on the side of the pixel electrode 3'), which is perpendicular to the surface of the insulating substrate 10.

The larger x and x' are, the more effectively the display unevenness is reduced. It is desirable to set the value of x and x' to preferably not less than 1 µm, more preferably not less than 5 µm, still more preferably not less than 10 µm, particularly preferably not less than 15 µm, so as to reducing the display unevenness of the display device by reducing the value ($\Delta\Delta\beta$) interrelated with the display unevenness of the display device.

In other words, it is desirable to set x and x' so that the value $\Delta\Delta\beta$ is preferably not more than 0.08, more preferably not more than 0.04, still more preferably not more than 0.01.

However, when x and x' exceed 10 µm, particularly 15 µm, the value $\Delta\Delta\beta$ is sufficiently decreased with it saturated, so that it is impossible to obtain a $\Delta\Delta\beta$ reduction effect corresponding to the increase in x and x'. While, as x and x' become larger, the aperture ratio drops. Then, as to x and x', the aforementioned value is set as a lower limit, and its upper limit is set to be within a range of preferably 20 µm, more preferably 15 µm, specifically, x and x' are set to be within a range of not less than 1 µm and not more than 20 µm for example, so that it is possible to prevent the aperture ratio from dropping while sufficiently improving the display unevenness of the display device.

y1 shown in FIG. 3 is a straight line which vertically extends from (i) an end of the BM 8 positioned on the side of the pixel electrode 3' (ii) to the surface of the insulating substrate 10. FIG. 3 shows that the straight line y1 crosses the pixel electrode 3'. That is, the pixel electrode 3' and the BM 8 overlap with each other. Further, a straight line y2 (same as in X1) shown in FIG. 3 is a straight line which vertically extends from the end of the pixel electrode 3' to the surface of the insulating substrate 10. Further, y is equal to a distance (shortest distance) between both the lines y1 and y2. In other words, y is equal to a distance between (i) a vertical plane, having the end face of the BM 8 so as to be positioned on the side of the pixel electrode 3', which is perpendicular to the surface of the insulating substrate 10 and (ii) a vertical plane, having the end face of the pixel electrode 3' (an end face positioned on the side of the source line, that is, positioned opposite to the end face of the pixel electrode 3), which is perpendicular to the surface of the insulating substrate 10. That is, y represents the width of the overlapping portion in which the BM 8 of a certain pixel overlaps with the pixel electrode 3' adjacent to the pixel.

Taking into consideration the alignment accuracy in the photolithograph step in forming the BM 8, it is preferable to set y to not less than 0.6 µm. In order to suppress the drop in the aperture ratio, it is preferable to set y to not more than 5 µm. The value of y is set to be within a range of not less than 0.6 µm and not more than 5 µm, so that it is possible to cover the gap with the BM 8 without fail while keeping the sufficient aperture ratio even when the alignment deviation occurs in the photolithograph step.

As described above, the active matrix substrate of the present embodiment, that is, the display device substrate is arranged so that the pixel electrode 3 is provided on a surface different from a surface having the source line 2. In view of a vertical direction with respect to the surface of the insulating substrate 10, the source line 2 is provided on an area having no pixel electrode 3, and a gap is provided between the source line 2 and the pixel electrode 3. According to the arrangement, it is possible to prevent the parasitic capacitance (Csd) between the pixel electrode 3 and the source line 2 from being uneven in the display area. Thus, in the case where the active matrix substrate 30 is used in the liquid crystal display device 40, it is possible to reduce the display unevenness.

Figure 16:
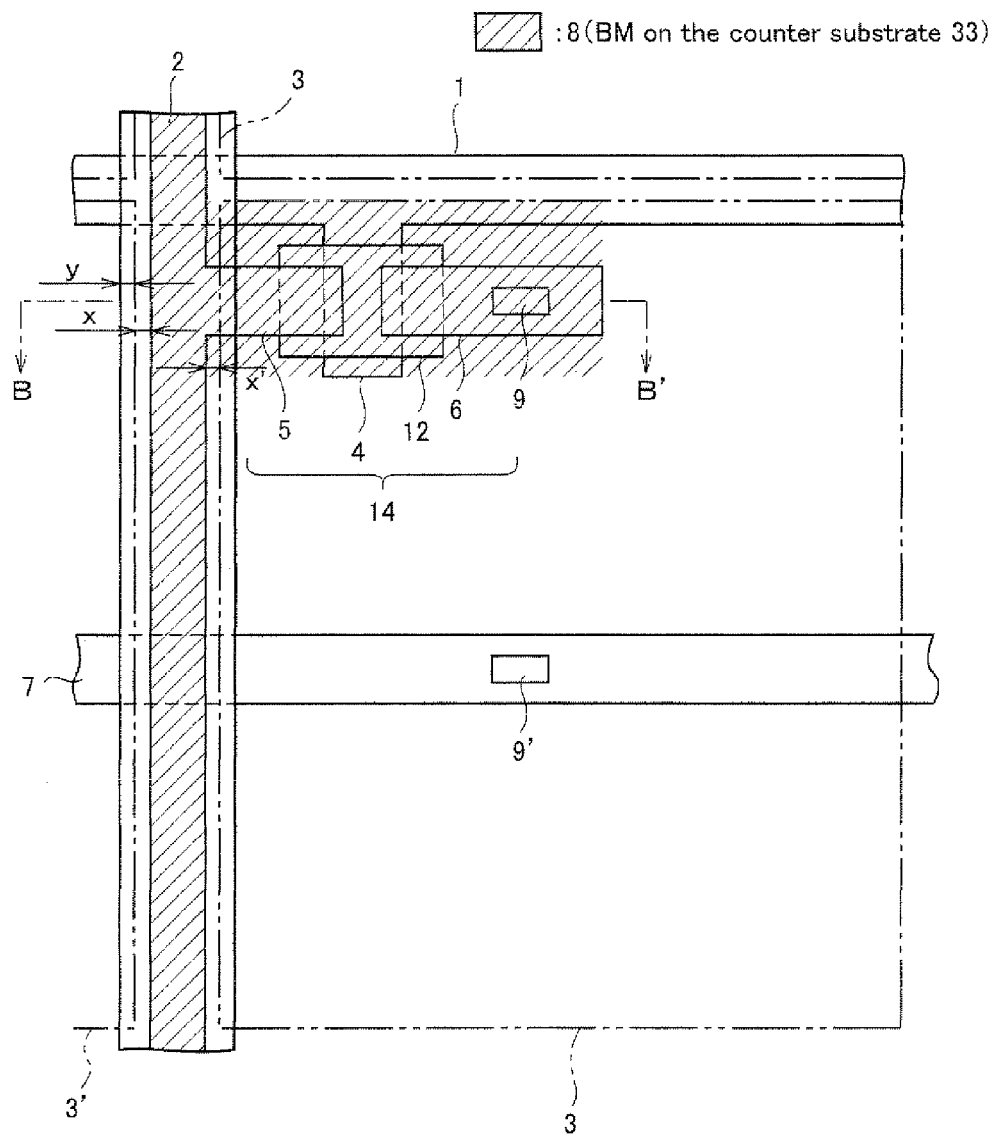
FIG. 16 is a plan view showing an example embodiment of a display device substrate wherein a black mask is provided on a counter substrate.

Further, in the present embodiment, the BM 8 is provided on the side of the active matrix substrate 30 so as to improve the aperture ratio. However, as shown in FIG. 16, it is also possible to provide the BM 8 on the counter substrate 33 positioned opposite to the active matrix substrate with the liquid crystal layer 32 therebetween. The BM 8 is provided on the active matrix substrate 30, so that it is possible to improve the display unevenness caused by the uneven parasitic capacitor (Csd) in the display area, thereby improving the yield. The BM 8 is provided on the side of the active matrix substrate 30, so that it is possible to improve the display unevenness and the yield, and it is possible to improve the aperture ratio as described above. Either of the substrates may have the BM 8, or it may be so arranged that the one substrate has the BM 8 and also the other substrate opposite to the one substrate has the BM 8.

Figure 14:
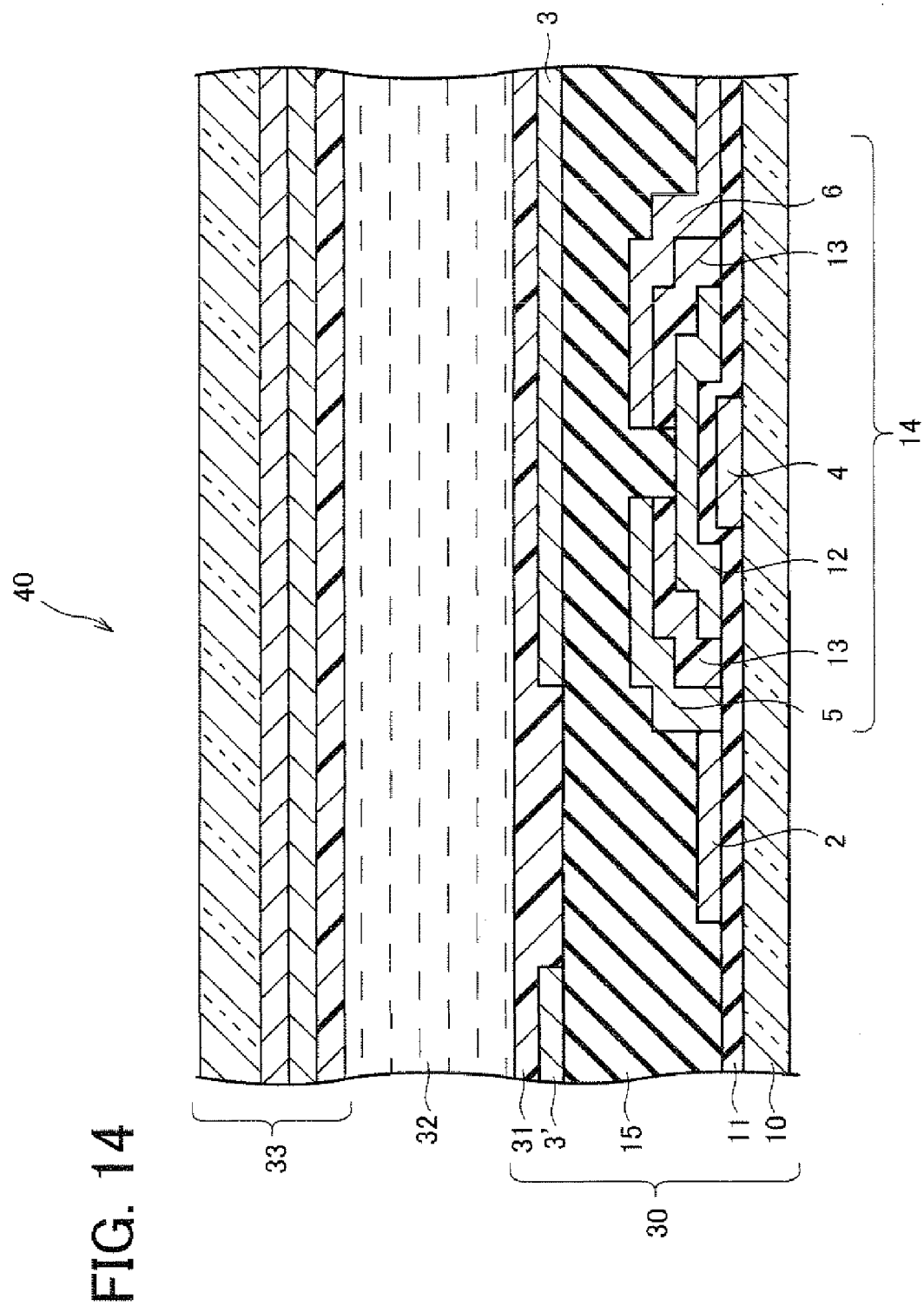
FIG. 14 is a cross sectional view showing another example embodiment of a display device substrate.
Figure 15:
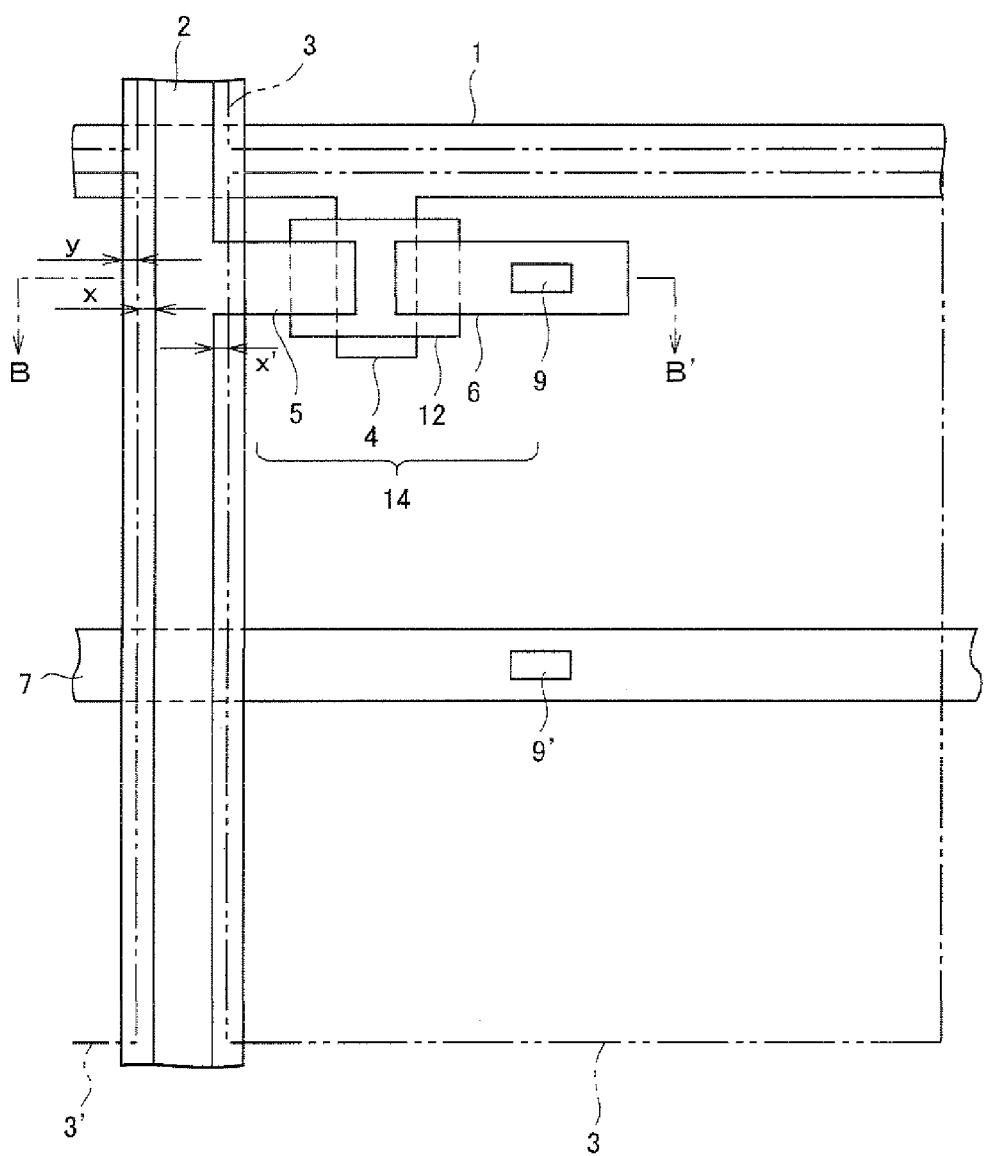
FIG. 15 is a plan view showing the embodiment of FIG. 14.

Further, the present embodiment explains mainly an arrangement in which the BM 8 is provided on the active matrix substrate 30, but the display device substrate according to the present invention is not limited to this. The pixel electrode is provided on a surface different from a surface having the signal line, and in view of a vertical direction with respect to the surface of the insulating substrate, the signal line is provided on an area having no pixel electrode, and a gap is provided between the signal line and the pixel electrode. As long as the display device substrate is arranged in this manner, it may be so arranged that the BM is not provided. See the embodiment of FIG. 14 and FIG. 15. That is, in view of a vertical direction with respect to the surface of the insulating substrate, a gap is provided between the signal line and the pixel electrode, so that a value ($\Delta\Delta\beta$) interrelated with the display unevenness becomes small, thereby reducing difference in a pixel potential effective value (Vd). As a result, it is possible to reduce the display unevenness of the display device.

It is general that the liquid crystal display device displays a predetermined image by controlling liquid crystal in accordance with a signal (voltage) applied to a pixel electrode. Thus, a voltage is not applied to an area having no pixel electrode, specifically, a voltage is not applied to a liquid crystal layer positioned in a gap between the signal line and the pixel electrode in view of a vertical direction with respect to a surface of an insulating substrate, so that it is sometimes difficult to control in a desired manner. Thus, in a display device of a normally white mode which causes light to be transmitted when a voltage is not applied and causes light to be shielded when a voltage is applied, there is a possibility that: when the pixel displays a black state, a white state occurs between the pixel electrode and the signal line, so that the contrast of the display image drops.

However, in a display device of a normally black mode which causes light to be transmitted when a voltage is applied, a black state is continuously displayed in the liquid crystal layer positioned in a gap between the signal line and the pixel electrode, so that the contrast of the display image does not drop. Thus, in the case where the display device substrate is used as a display device substrate of a normally black mode, it is not necessary to provide a light shielding film on a gap between the pixel electrodes adjacent to each other with the signal line therebetween. See FIG. 14 and FIG. 15.

While, in the case where the display device substrate is used as a display device substrate of a normally white mode, in view of a vertical direction with respect to the surface of the insulating substrate, it is preferable that the light shielding film covers a surface of the signal line and a gap between the signal line and the pixel electrode, that is, a gap between the pixel electrodes adjacent to each other with the signal line therebetween. Thus, it is possible to prevent the contrast of the display image from dropping. Further, it is possible to increase a response speed at which writing is performed by the display device when the pixel displays a white state. This is because a portion, positioned in the gap, whose response speed is slow is hidden. Thus, it is needless to say that the display device substrate having the light shielding film according to the present embodiment, specifically, the active matrix substrate 30 according to the present embodiment can be preferably used in a display device of a normally black mode, and it is possible to preferably use the display device substrate (active matrix substrate 30) in a display device of a normally white mode.

In the case where the display device substrate having the light shielding film according to the present embodiment is used in a display of a normally black mode, when the pixel displays a black state, a black portion, positioned in the gap, whose response speed is slow, is hidden by the light shielding film, so that it is possible to increase the response speed at which the writing is performed by the display device.

As to the display device according to the present embodiment, it is possible to optimize the display device so as to correspond to the aforementioned modes (normally white mode, normally black mode) by using ordinary means, for example, by determining (i) a direction of a polarizing plate and (ii) a liquid crystal material, or in the similar manner.

Further, the present embodiment explains the active matrix substrate for the liquid crystal display device as a specific example of the display device substrate, but the present invention is not limited to this. The display device substrate can be used as a display device substrate for a display device other than the liquid crystal display device.

Embodiment 2

Figure 4:
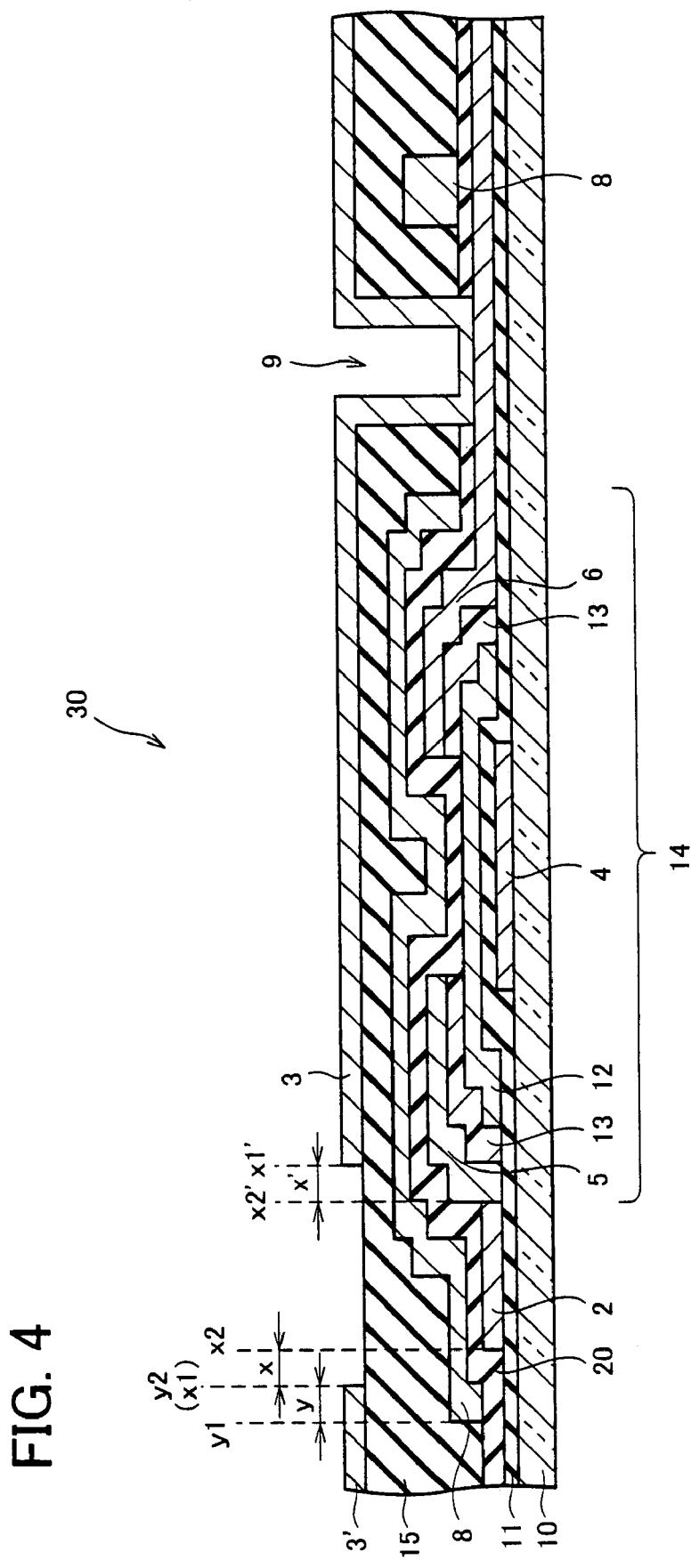
FIG. 4 is a cross sectional view showing another example embodiment of the display device substrate.

The following description will explain one embodiment of the present invention with reference to FIG. 2 to FIG. 4. For convenience in the description, the same reference signs are given to the members having the same functions as the members shown in drawings of Embodiment 1, and description thereof is omitted. Further, various characteristics described in Embodiment 1 can be combined with characteristics described in the present embodiment.

Embodiment 2 describes the active matrix substrate 30, having a stacking body constituted of a two-or-more-layered interlayer insulating film, with reference to FIG. 2 and FIG. 4. The plan view (FIG. 2) illustrates the same arrangement as in Embodiment 1. FIG. 4 is a cross sectional view taken along B-B' line shown in FIG. 2.

The following description will explain a manufacturing method of the active matrix substrate 30 which includes a two-or-more-layered interlayer insulating film.

First, the gate line 1, the gate electrode 4, and the auxiliary capacitor line 7 are formed on the insulating substrate 10 constituted of an insulator made of glass and the like in accordance with the same process. Next, the gate insulating film 11 is formed on a surface thereof.

Next, the active element 14 such as a thin film transistor (TFT), the source line 2, and the source electrode 5 are formed. The source line 2 and the source electrode 5 are formed in accordance with the same process.

The active element 14 shown in FIG. 2 and FIG. 4 is formed as follows. First, the active semiconductor layer 12 is formed. Next, the amorphous silicon (for example, an n-type amorphous silicon) layer 13 is formed. Further, the source line 2, the source electrode 5, and the drain electrode 6 are formed (the source line 2 and the source electrode 5 are formed in accordance with the same process).

Next, a second interlayer insulating film 20 is formed in accordance with a CVD process, and patterning is performed with respect to the second interlayer insulating film 20. On the second interlayer insulating film 20, the contact hole 9 which connects the drain electrode 6 of the active element 14 to the pixel electrode 3 is formed, and the contact hole 9' which connects the auxiliary capacitor line 7 for generating the auxiliary capacitance to the pixel electrode 3 is formed.

Next, the BM 8 is formed in the present embodiment, tantalum (Ta) is used as the material for the BM 8. Specifically, first, a Ta film is formed by using a sputtering device. Next, patterning is performed with respect to the Ta film so as to cover the active element 14, the source line 2, the gate line 1, and the auxiliary capacitor line 7, and so as to overlap with the pixel electrodes 3 and 3' in a two-dimensional manner, thereby obtaining the BM 8. The patterning is photolithograph patterning performed by using a pattern mask. As shown in FIG. 2 and FIG. 4, the BM 8 is not formed on the contact holes 9 and 9' and peripheral portions thereof.

Thereafter, the interlayer insulating film 15 is formed so as to cover whole the surface of the insulating substrate 10 having the BM 8 by using a negative photosensitive transparent resin. Next, the contact holes 9 and 9' are formed on the interlayer insulating film 15. Next, the transparent pixel electrode is formed so as to coat the contact holes 9 and 9'. Next, patterning is performed with respect to the transparent pixel electrode, thereby obtaining the pixel electrodes 3 and 3'. Due to the patterning, it is possible to obtain a two-dimensional distance between the source line 2 and each of the pixel electrodes 3 and 3'.

In the present embodiment, as shown in FIG. 4, two layers (interlayer insulating film 15 and the second interlayer insulating film 20) of the interlayer insulating films are stacked. That is, the interlayer insulating films are provided as a stacking body constituted of two or more layers.

Further, the negative photosensitive transparent resin is used as the interlayer insulating film 15, but the arrangement is not limited to this. It is possible to use a material, such as an $SiN_x$ film (silicon nitride film) based on a CVD process, which brings about desired dielectric constant and transmittance, for example. Further, the $SiN_x$ film based on the CVD process is used as the second interlayer insulating film 20, but it is possible to use other negative photosensitive transparent resin. Examples of the photosensitive transparent resin include acrylic resin, epoxy resin, polyurethane resin, polyimide resin, and the like.

Further, the BM 8 (light shielding film) is stacked between an uppermost layer (interlayer insulating film 15) constituting the interlayer insulating film and a lowermost layer (second interlayer insulating film 20) constituting the interlayer insulating film. In the present embodiment, metal is used to form the BM 8. Specifically, Ta formed in accordance with sputtering is used to form the BM 8. However, the material for the BM 8 is not limited to Ta. As the material for the BM 8 in the present embodiment, It is possible to use a material other than Ta, for example, it is possible to use metal such as Cr (chromium), the material for the BM that is used in Embodiment 1, and the like. As described above, the BM (light shielding film) 8 is stacked between the uppermost layer (interlayer insulating film 15) constituting the interlayer insulating film and the lowermost layer (second interlayer insulating film 20) constituting the interlayer insulating film, that is, the BM 8 is stacked via the interlayer insulating films, it is possible to use metal or resin having an insulating property in forming the BM 8. Thus, it is not necessary to use a specific material (insulating material).

In the present embodiment, as in Embodiment 1, it is desirable to set the value of x and x' that are shown in FIG. 4 so that: its lower limit is preferably 1 μm, more preferably 5 μm, still more preferably 10 μm, particularly preferably 15 μm, and its upper limit is preferably 20 μm, more preferably within a range of 15 μm. It is desirable to set y, which represents the width of the overlapping portion in which the BM 8 of a certain pixel overlaps with the pixel electrode 3' adjacent to the pixel, to be within a range of from not less than 0.6 μm to not more than 5 μm.

Further, also in the present embodiment, it is needless to say that the display device substrate having the light shielding film according to the present embodiment, specifically, the active matrix substrate 30 according to the present embodiment can be preferably used in a display device of a normally black mode, and it is possible to preferably use the display device substrate (active matrix substrate 30) in a display device of a normally white mode.

As described above, the display device substrate includes: one or more pixel electrodes each of which is provided on each intersection of a signal line and a scanning line that are provided on an insulating substrate; and an interlayer insulating film stacked between the signal line and the pixel electrode, and in view of a vertical direction with respect to a surface of the insulating substrate, the signal line is provided on an area on which the pixel electrode is not provided, and a gap is provided between the signal line and the pixel electrode.

As described above, the display device substrate is arranged so that a gap is provided between the signal line and the pixel electrode. Thus, a value ($\Delta\Delta\beta$) interrelated with display unevenness of the display device is reduced. When $\Delta\Delta\beta$ is reduced, difference in a pixel potential effective value (Vd) is reduced. As a result, it is possible to reduce the display unevenness of the display device.

Further, the display device substrate is arranged so that: in view of a vertical direction with respect to a surface of the insulating substrate, the light shielding film covers a surface of the signal line (source line) and the gap between the signal line and the pixel electrode. Thus, in addition to the foregoing effect, when the present substrate is used in a display device so that light leakage is prevented, it is possible to exhibit higher display performance.

Further, the display device substrate further includes: an active element provided on each intersection of the signal line and the scanning line; a light shielding film provided so as to cover at least a surface of the signal line among the signal line, the active element, and the scanning line, wherein in view of the vertical direction with respect to the surface of the insulating substrate, a gap between the pixel electrodes which are adjacent to each other with the signal line therebetween is covered by the light shielding film.

According to the arrangement, when the present substrate is used in a display device so that light leakage is prevented, it is possible to exhibit higher display performance.

Further, in addition, it may be so arranged that the display device substrate includes: an active element provided on each intersection of the signal line and the scanning line; a light shielding film provided so as to cover at least a surface of the signal line among the signal line, the active element, and the scanning line, wherein in view of the vertical direction with respect to the surface of the insulating substrate, (i) the light shielding film which covers the surface of the signal line and (ii) the pixel electrode overlap with each other.

According to the arrangement, when the present substrate is used in a display device so that light leakage is prevented, it is possible to exhibit higher display performance. Particularly, according to the arrangement, the light shielding film and the pixel electrode overlap with each other, so that it is possible to prevent the light leakage without fail when the alignment deviation occurs in the patterning based on the photolithograph step or the like.

Further, it is also possible to arrange the display device substrate so as to include: an active element provided on each intersection of the signal line and the scanning line; a contact hole for allowing the active element and the pixel electrode to be in contact with each other; and a light shielding film provided so as to cover surfaces of the active element, the signal line, and the scanning line, wherein in view of the vertical direction with respect to the surface of the insulating substrate, (i) the light shielding film which covers the surface of the signal line and (ii) the pixel electrode overlap with each other.

According to the arrangement, when the present substrate is used in a display device so that light leakage is prevented, it is possible to exhibit higher display performance. Particularly, according to the arrangement, the light shielding film and the pixel electrode overlap with each other, so that it is possible to prevent the light leakage without fail when the alignment deviation occurs in the patterning based on the photolithograph step or the like.

Further, according to the arrangement, the active element and the pixel electrode are allowed to be in contact with each other via the contact hole, and the pixel electrode is provided on the interlayer insulating film, so that it is possible to separate the signal line (source line) from the pixel electrode so that they are not positioned in the same face. As a result, in addition to the foregoing effect, it is possible to prevent short circuit and connection failure between the pixel electrode and the signal line (source line), thereby preventing the yield from dropping.

Further, it may be so arranged that: the display device substrate further includes: an active element provided on each intersection of the signal line and the scanning line; a contact hole for allowing the active element and the pixel electrode to be in contact with each other; and a light shielding film provided so as to cover surfaces of the active element, the signal line, and the scanning line, wherein: the interlayer insulating film is a stacking body made of two or more layers, and the light shielding film is stacked between an uppermost layer and a lowermost layer that constitute the interlayer insulating film, and in view of the vertical direction with respect to the surface of the insulating substrate, a gap between the pixel electrodes which are adjacent to each other with the signal line therebetween is covered by the light shielding film.

According to the arrangement, the interlayer insulating film stacked between the signal line and the pixel electrode is a stacking body made of two or more layers. Further, the light shielding film is stacked between the uppermost layer and the lowermost layer that constitute the interlayer insulating film. As a result, it is not necessary to use a specific material to form the light shielding film. Thus, according to the arrangement, in addition to the foregoing effect, it is possible to use not only resin having a light shielding property and an insulating property but also a metal for example, as a material for the light shielding film.

Further, it may be so arranged that: the display device substrate further includes: an active element provided on each intersection of the signal line (source line) and the scanning line (gate line); a light shielding film provided so as to cover at least a surface of the signal line among the signal line, the active element, and the scanning line, wherein the interlayer insulating film is a stacking body made of two or more layers, and the light shielding film is stacked between an uppermost layer and a lowermost layer that constitute the interlayer insulating film, and in view of the vertical direction with respect to the surface of the insulating substrate, (i) the light shielding film which covers the surface of the signal line and (ii) the pixel electrode overlap with each other.

According to the arrangement, the interlayer insulating film stacked between the signal line and the pixel electrode is a stacking body made of two or more layers. Further, the light shielding film is stacked between the uppermost layer and the lowermost layer that constitute the interlayer insulating film. As a result, it is not necessary to use a specific material to form the light shielding film. Thus, according to the arrangement, in addition to the foregoing effect, it is possible to use not only resin having a light shielding property and an insulating property but also a metal for example, as a material for the light shielding film.

Further, it is also possible to arrange the display device substrate so as to include: an active element provided on each intersection of the signal line (source line) and the scanning line (gate line); a contact hole for allowing the active element and the pixel electrode to be in contact with each other; and a light shielding film provided so as to cover surfaces of the active element, the signal line, and the scanning line, wherein: the interlayer insulating film is a stacking body made of two or more layers, and the light shielding film is stacked between an uppermost layer and a lowermost layer that constitute the interlayer insulating film, and in view of the vertical direction with respect to the surface of the insulating substrate, (i) the light shielding film which covers the surface of the signal line and (ii) the pixel electrode overlap with each other.

According to the arrangement, the interlayer insulating film stacked between the signal line and the pixel electrode is a stacking body made of two or more layers. Further, the light shielding film is stacked between the uppermost layer and the lowermost layer that constitute the interlayer insulating film. As a result, it is not necessary to use a specific material to form the light shielding film. Thus, according to the arrangement, in addition to the foregoing effect, it is possible to use not only resin having a light shielding property and an insulating property but also a metal for example, as a material for the light shielding film.

Further, it is preferable to arrange the display device substrate so that the light shielding film is made of resin having an insulating property.

According to the arrangement, it is comparatively easy to form the light shielding film. Thus, in addition to the foregoing effect, it is possible to form the light shielding film by using, for example, a photosensitive resin material, based on a dry film lamination process, in which carbon is dispersed.

Further, it is preferable to arrange the display device substrate so that the light shielding film is made of metal.

According to the arrangement, it is easy to form the light shielding film which effectively shields light.

Further, as described above, the display device substrate is arranged so that: when the gap is within a range of from not less than 1 μm to not more than 20 μm, the value $\Delta\Delta\beta$ is sufficiently decreased with it saturated. Thus, the gap is set within the foregoing range, so that it is possible to prevent the aperture ratio from dropping while sufficiently improving the display unevenness of the display device.

It may be so arranged that the display device substrate includes: an active element provided on each intersection of the signal line and the scanning line; a contact hole for allowing the active element and the pixel electrode to be in contact with each other; and a light shielding film which is stacked between the uppermost layer and the lowermost layer, that constitute the interlayer insulating film, so as to cover a surface of the signal line, wherein: each of one or more contact holes is provided on the interlayer insulating film between the signal line and the metallic light shielding film, and the metallic light shielding film is connected to the signal line via the contact hole.

Further, it is possible to arrange the liquid crystal display device so as to include the display device substrate of the present invention.

According to the arrangement, the display device substrate provided in the liquid crystal display device is such that: in view of a vertical direction with respect to a surface of the insulating substrate, the signal line is provided on an area on which the pixel electrode is not provided, and a gap is provided between the signal line and the pixel electrode. In this manner, a gap is provided between the signal line and the pixel electrode, so that a value ($\Delta\Delta\beta$) interrelated with display unevenness of the display device is reduced. When $\Delta\Delta\beta$ is reduced, difference in a pixel potential effective value (Vd) is reduced. Thus, according to the arrangement, it is possible to provide a liquid crystal display device which can reduce the display unevenness of the display device.

As described above, the display device substrate can improve the display unevenness caused by such phenomenon that the parasitic capacitance between the pixel electrode and the signal line is uneven in the display area. The display device substrate is preferably used in a display device such as an active matrix type liquid crystal display device. For example, the display device substrate can be widely used in various kinds of electronic devices: an OA device such as a personal computer, an AV device such as a television, and a cellular phone, etc.

The invention may be varied in many ways within a scope of the following claims. Embodiments obtained by combining technical means disclosed in different examples and embodiments as required are included in the technical scope of the invention.

EXAMPLE

The following description will explain an example of the present invention with reference to FIG. 5 to FIG. 13.

The example shows a case where the parasitic capacitance (Csd) between the pixel electrode and the source line is adjusted so as to reduce its unevenness in the display area so that the display unevenness is reduced.

Figure 5:
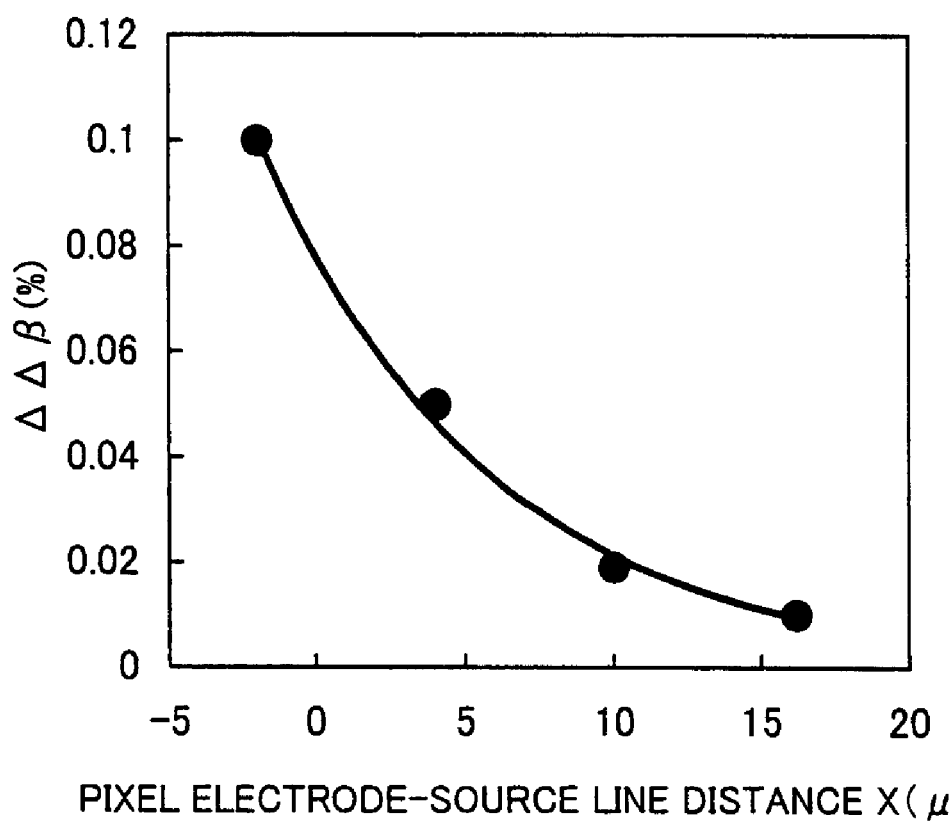
FIG. 5 is a graph showing a relationship between a distance from a pixel electrode to a source line and a $\Delta\Delta\beta$ value in the display device substrate.
Figure 6:
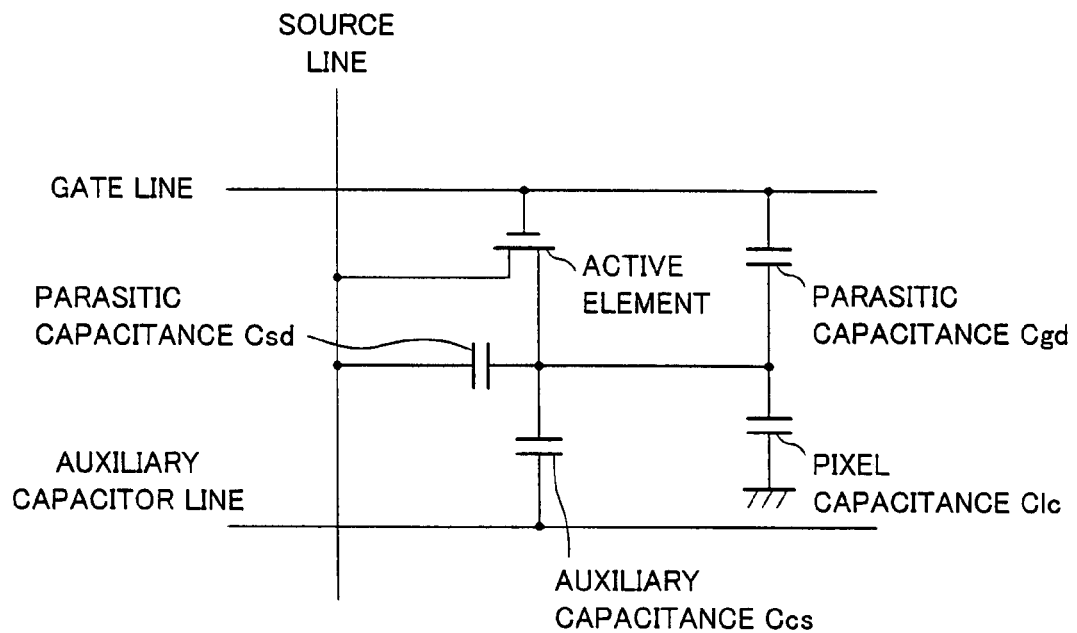
FIG. 6 is a simple equivalent circuit diagram showing an example active matrix type liquid crystal display device.

FIG. 5 shows a relationship between a $\Delta\Delta\beta$ value interrelated with the display unevenness and a gap (distance)

between the pixel electrode and the source line. Further, FIG. 6 is a simple equivalent circuit diagram of an active matrix type liquid crystal display device.

In FIG. 5, a vertical axis represents the ΔΔβ value, and a horizontal axis represents a value of the gap x between the pixel electrode and the source line. When x is less than zero, this means that the source line and the pixel electrode overlap with each other to some extent.

The ΔΔβ value plotted in FIG. 5 is calculated under the following condition. In the present example, x and x' that are shown in FIGS. 2 and 3 are set to the same value (x=x'), thereby obtaining a value shown by a graph of FIG. 5. Further, a film thickness of the BM is set to 1.0 μm, and a film thickness of the interlayer insulating film is set to 2.5 μm, and y=2.0 μm. Acrylic resin in which carbon is dispersed (dielectric constant is 4.0) is used to form the BM, and acrylic transparent resin (dielectric constant is 3.7) is used to form the interlayer insulating film. Further, alignment difference between a light-emitted portion and a light-non-emitted portion in the lithography process in performing the pixel ITO photolithograph (relative difference between a source pattern and a pixel ITO pattern) is set to 0.1 μm. Further, difference in a pixel 1A is 0 μm and difference in a pixel 2A is 0.1 μm (in a direction in which its source becomes smaller). Further, an input tone is set to be an intermediate tone, and an input tone voltage is set to Vs=2.5V (TN product). A picture element (pixel) size is set to 15"XGA (picture element (pixel) pitch is 99 μm).

According to the graph shown in FIG. 5, the larger the value of x becomes, the smaller the ΔΔβ value becomes.

Next, taking dot reversal driving as an example, a relationship between the ΔΔβ value (%) and the display unevenness is described as follows. The pixel capacitance is Clc, and the pixel auxiliary capacitance is Csc, and the parasitic capacitance between the gate line and the pixel electrode is Cgd, and the parasitic capacitance between the source line and the pixel electrode is Csd. Further, FIG. 6 is a simple equivalent circuit diagram showing an active matrix type liquid crystal display device. Further, Cpix is calculated by summing up Clc, Ccs, Cgd, and Csd (Cpix=Clc+Ccs+Cgd+Csd). Further, β is set as follows: β=Csd/Cpix.

In the dot reversal driving system, Csd is divided into (i) a capacitance component Csd1 generated by a source line which drives a target pixel electrode and (ii) a capacitance component Csd2 generated by a source line which drives a pixel electrode adjacent to the target pixel electrode. Further, a source signal amplitude is Vspp. Further, Δβ is set as follows: Δβ=(Csd1−Csd2)/Cpix. At this time, the pixel potential effective value Vd obtained after charging the pixel at the source voltage Vs can be expressed by the following expression.

$$Vd \approx Vs - Vspp \times \Delta\beta/2 \quad \text{(approximate expression)}$$

Figure 7:
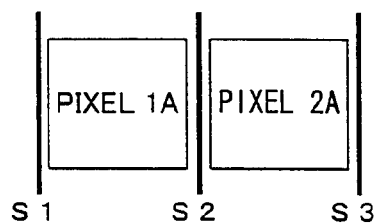
FIG. 7 is a schematic, showing a relationship between a pixel and a source line, which is used as an example to illustrate a relationship between $\Delta\Delta\beta$ and Vd difference.

The display unevenness is caused by the difference in Vd. A relationship between the difference in Vd and the ΔΔβ is described as follows with reference to FIG. 7 showing a schematic of the pixel and the source line. As shown in FIG. 7, a source line connected to a pixel electrode of the pixel 1A via the active element is S1, and a source line connected to a pixel electrode of the pixel 2A via the active element is S2. Likewise, a source line connected to a pixel NA via the active element is S (N). Further, a source line for charging a corresponding (specific) pixel is defined as "corresponding source". Further, a source line which has a pixel electrode and a capacitor but does not charge a corresponding (specific) pixel is defined as "noncorresponding source".

In FIG. 7, a relationship between the corresponding source and the noncorresponding source in the pixel 1A is as follows. That is, the corresponding source is S1 (corresponding source=S1), and the noncorresponding source is S2 (noncorresponding source=S2). A relationship between the corresponding source and the noncorresponding source in the pixel 2A is as follows: the corresponding source=S2, and the noncorresponding source=S3. Likewise, a relationship between the corresponding source and the noncorresponding source in the pixel NA is as follows: the corresponding source=S (N), and the noncorresponding source=S (N+1).

Further, capacitance between the pixel electrode and the corresponding source (Csd·corresponding) is Csd 11, that is, capacitance between the pixel electrode and the corresponding source=Csd·corresponding=Csd 11. Further, capacitance between the pixel electrode and the noncorresponding source (Csd·noncorresponding) is Csd 12, that is, capacitance between the pixel electrode and the noncorresponding source=Csd·noncorresponding=Csd 12.

Δβ of the pixel electrode in the pixel 1A is Δβ1, and Δβ of the pixel electrode in the pixel 2A is Δβ2. At this time, Δβ1 is such that: Δβ1=Csd·corresponding/Cpix−Csd·noncorresponding/Cpix, that is, Δβ1=(Csd11−Csd12)/Cpix. Likewise, Δβ2 is such that: Δβ2=(Csd22−Csd23)/Cpix.

In a case of driving performed by means of the sources adjacent to each other which are different from each other in terms of polarity like dot reversal driving, a display property (difference between an input tone voltage Vs and an actual tone voltage=effective value Vd) is determined in accordance with difference (β corresponding−β noncorresponding=Δβ) between the pixel electrode-corresponding source capacitance (Csd−corresponding) and the pixel-other source capacitance (Csd−noncorresponding) in terms of a Cpix ratio (Csd−corresponding·noncorresponding/Cpix=β−corresponding·noncorresponding). For example, in a case where any cause, specifically, such cause that the alignment difference between a light-emitted portion and a light-non-emitted portion (generally ±0.3 μm) occurs in the lithography process brings about such condition that (i) a positional relationship between the pixel electrode and the source line in the pixel 1A differs from (ii) a positional relationship between the pixel electrode and the source line in the pixel 2A, a value of Δβ1 differs from a value of Δβ2.

As described above, when there is difference in Δβ, there occurs difference between Vd of the pixel 1A and Vd of the pixel 2A, so that the unevenness (luminance difference) occurs. That is, it is possible to relatively perform comparison as to degree of the unevenness (luminance difference) in accordance with ΔΔβ=Δβ1−Δβ2. Note that, when this is explained by using the foregoing expressions, the following (Calculation 1) holds. Thus, the smaller ΔΔβ becomes, the smaller the difference in Vd becomes. As a result, the display unevenness is reduced.

Calculation 1

Δβ(Δβ1) of the pixel electrode 1 and Δβ(Δβ2) of the pixel electrode 2 are as follows:

$$\Delta\beta1 = (Csd11 - Csd12)/Cpix$$

$$\Delta\beta2 = (Csd22 - Csd23)/Cpix.$$

Further, Vd of the pixel electrode 1 is Vd1, and Vd of the pixel electrode 2 is Vd2. At this time, difference between Vd1 and Vd2 in terms of the effective value corresponds to difference in terms of luminance. This causes the display unevenness.

The difference between Vd1 and Vd2 is expressed by using the following approximate expression of Vd.

$$Vd1 - Vd2 \approx (Vs - (Vspp/2) \times \Delta\beta1) - (Vs - (Vspp/2) \times \Delta\beta2)$$
$$= (Vspp/2) \times (\Delta\beta2 - \Delta\beta1)$$
$$\approx (Vspp/2) \times \Delta\Delta\beta$$
$$\approx \text{input tone voltage } Vs \times \Delta\Delta\beta$$

Figure 8:
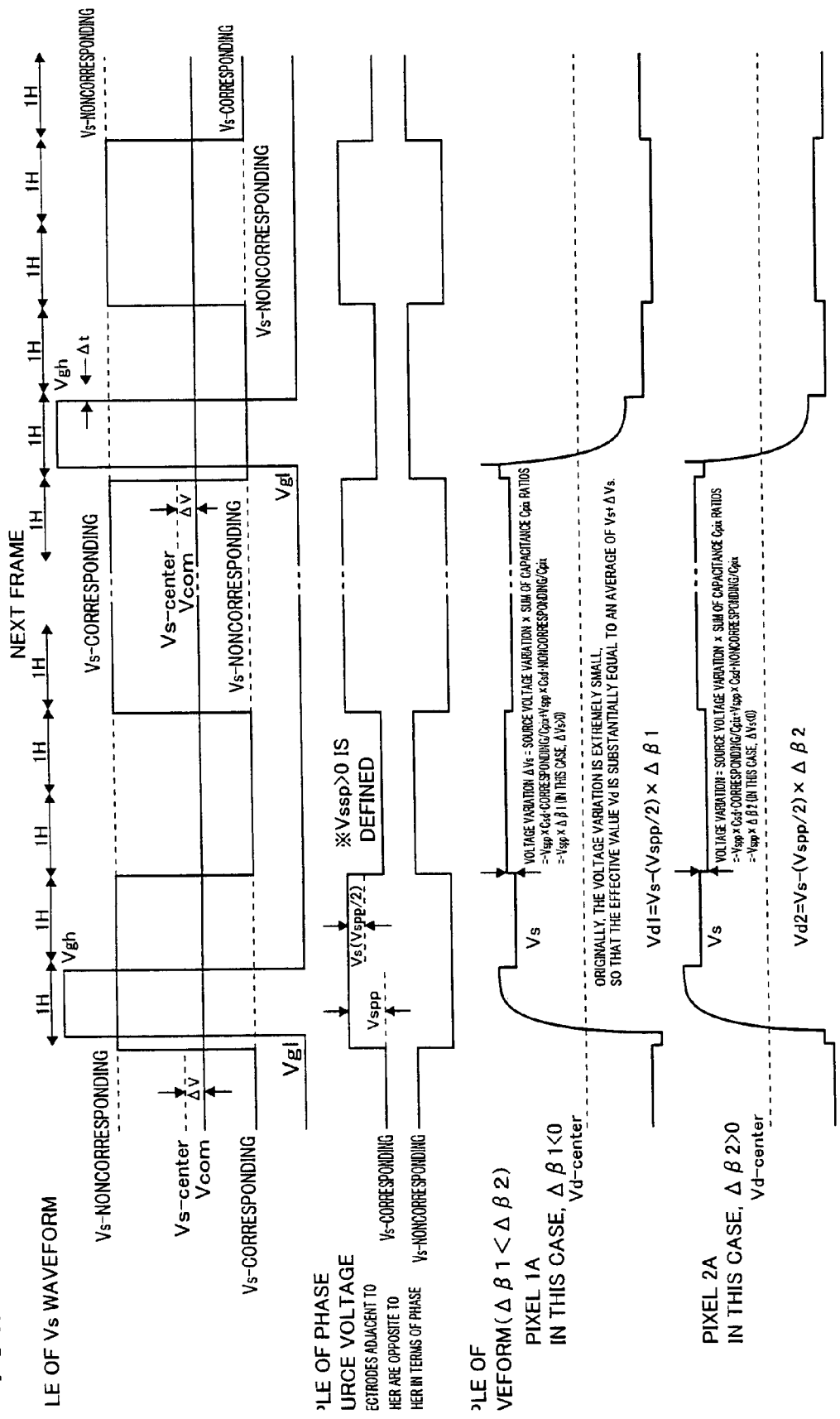
FIG. 8 is a schematic, showing various kinds of waveforms in DOT reversal driving performed at a horizontal 2H cycle, which is used as an example to illustrate an approximate expression of Vd.
Figure 9:
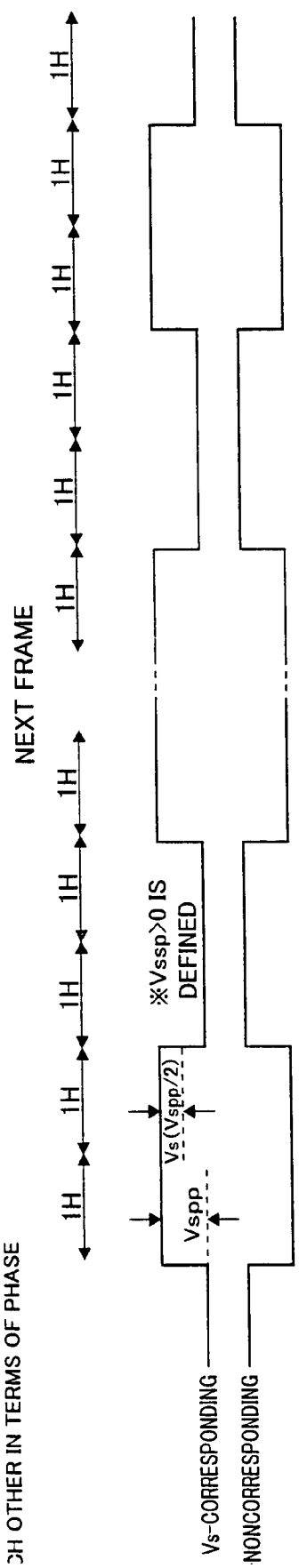
FIG. 9 is a schematic for illustrating an example of a phase of a source voltage of FIG. 8 in detail.
Figure 10:
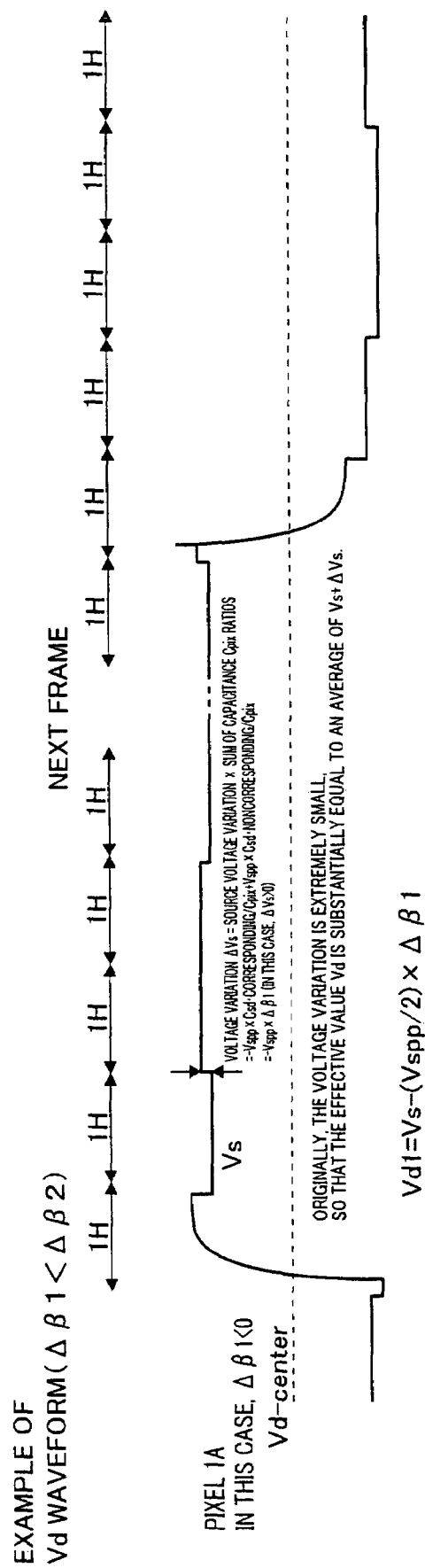
FIG. 10 is a schematic for illustrating a waveform (pixel 1A) of Vd of FIG. 8.
Figure 11:
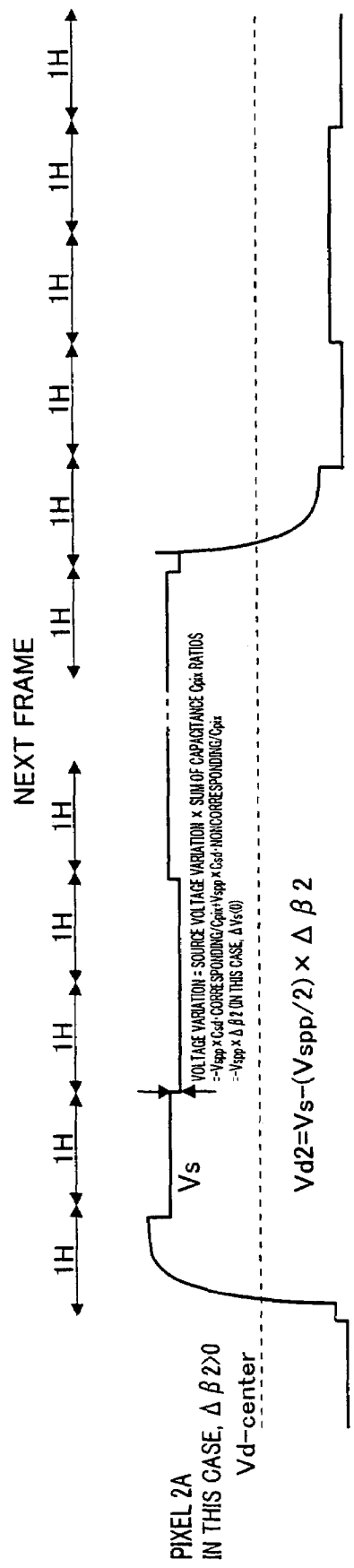
FIG. 11 is a schematic for illustrating a waveform (pixel 2A) of Vd of FIG. 8.
Figure 12:
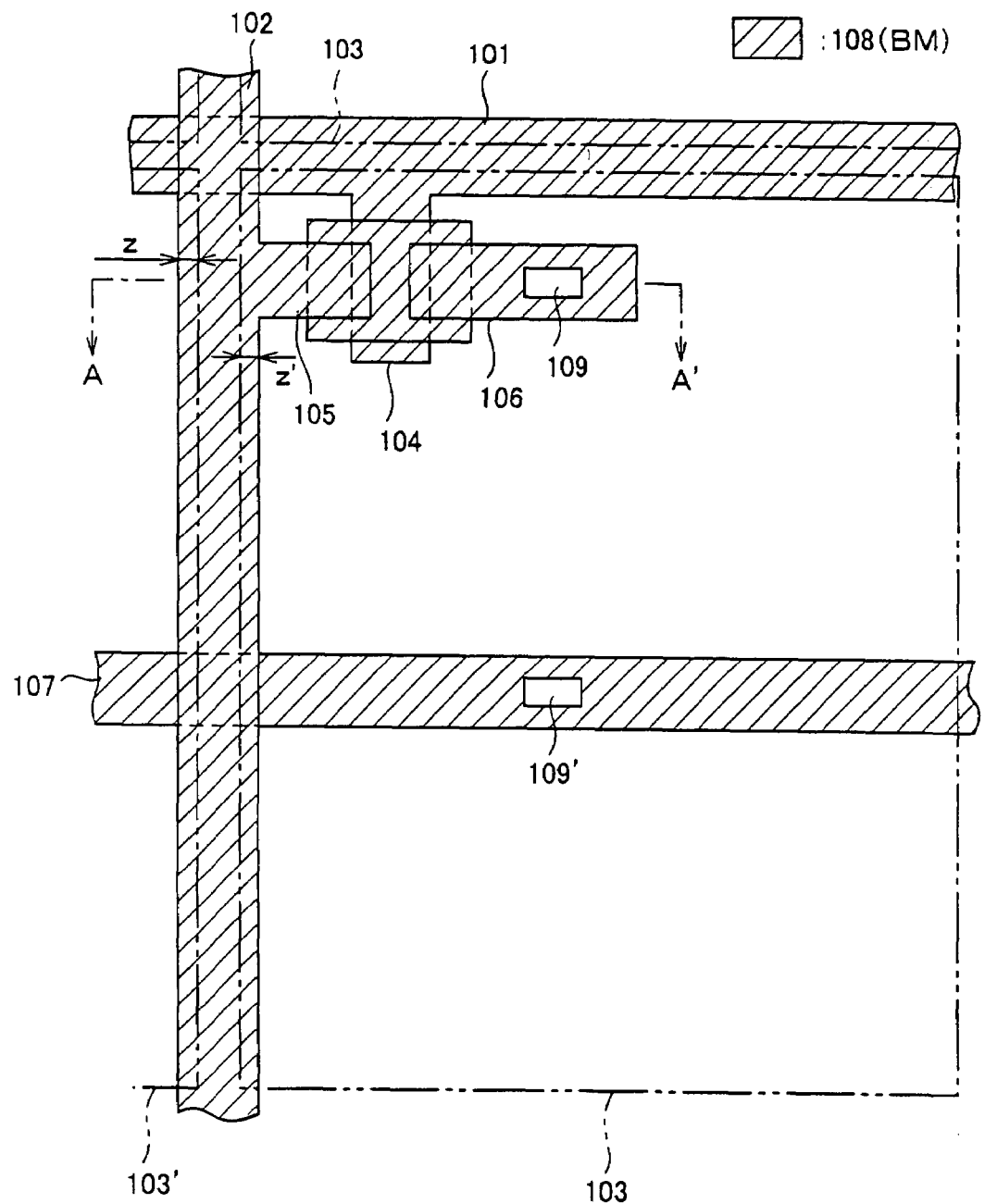
FIG. 12 is a plan view showing a conventional display device substrate.
Figure 13:
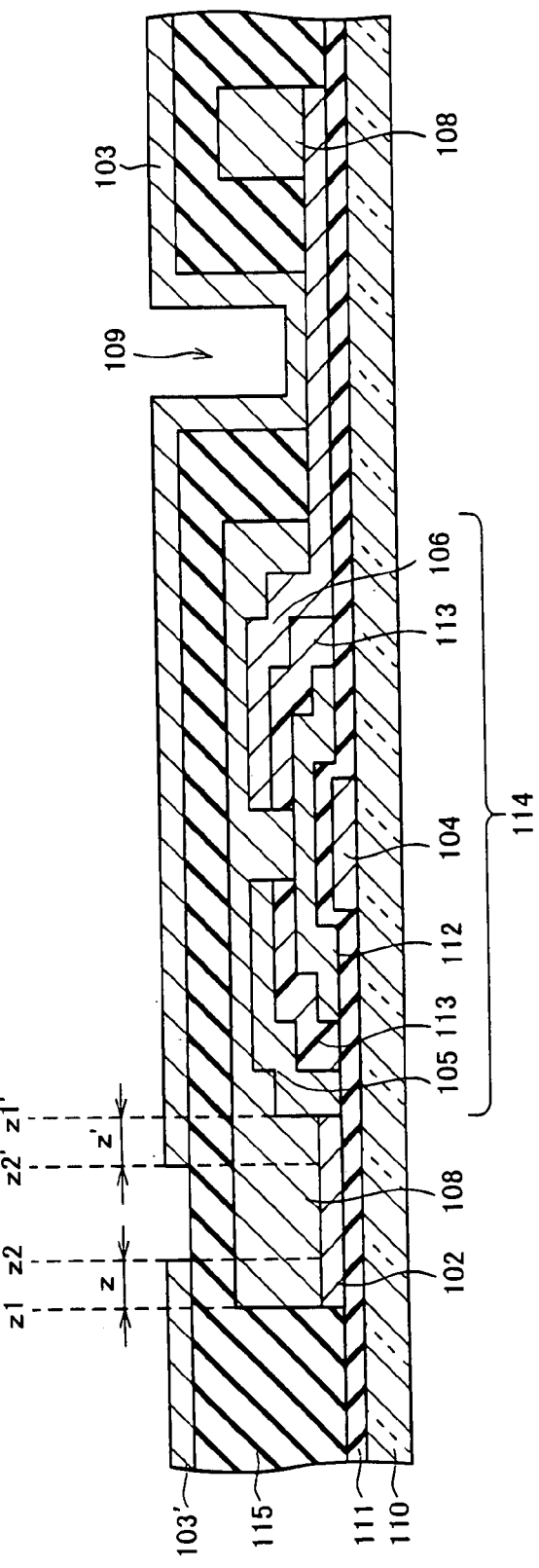
FIG. 13 is a cross sectional view showing a conventional display device substrate.

Incidentally, the foregoing approximate expression is used in calculating Vd. The approximate expression of Vd is described as follows with reference to FIG. 8 to FIG. 11. FIG. 8 shows a waveform in the DOT reversal driving (reversal at each frame) at a horizontal 2H cycle. FIG. 9 details only an example of a phase of a source voltage shown in FIG. 8. FIG. 10 details only an example (pixel 1A) of a Vd waveform shown in FIG. 8. FIG. 11 details only an example (pixel 2A) of a VD waveform shown in FIG. 8.

As shown in FIG. 10, when the voltage variation is extremely small, Vd is substantially equal to an average of Vs and Vs+ΔVs. Further, as shown in FIG. 10, it is possible to consider that ΔVs is a total of the Cpix ratios of ΔVs=the source voltage variation×the capacitance. As a result, in an example shown in FIG. 10, ΔVs=−Vspp×Δβ1, and Vd1 can be approximated to Vd1=Vs−(Vspp/2)×Δβ1. Likewise, in an example shown in FIG. 11, Vd2 can be approximated to Vd2=Vs−(Vspp/2)×Δβ2.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

The invention claimed is:

1. A display device substrate, comprising:
   one or more pixel electrodes each of which is provided on each intersection of a signal line and a scanning line that are provided on an insulating substrate; and
   an interlayer insulating film stacked between the signal line and the pixel electrode, wherein
   the display device substrate is for a normally black mode, and in view of a vertical direction with respect to a surface of the insulating substrate, the signal line is provided on an area on which the pixel electrode is not provided, and a gap is provided between the signal line and the pixel electrode, and a light shielding film is not provided in a gap between the pixel electrodes which are adjacent to each other with the signal line therebetween;
   in view of the vertical direction with respect to the surface of the insulating substrate, the insulation substrate, the scanning line, a gate insulating film, the signal line, the interlayer insulating film, the pixel electrode are provide in this order; and
   wherein the gap includes an area in which no voltage is applied to a region between the pixel electrode and the signal line.

2. The display device substrate as set forth in claim 1, wherein the gap between the signal line and the pixel electrode is set to be within a range of from not less than 1 pm to not more than 20 μm.

3. The display device substrate as set forth in claim 1, wherein a size of the gap between the signal line and the pixel electrode is set to provide a desired ΔΔβ value which is interrelated with display unevenness.

4. The display device substrate as set forth in claim 3, wherein the desired ΔΔβ value is not more than 0.08.

5. The display device substrate as set forth in claim 3, wherein the desired ΔΔβ value is in turn related to a difference in parasitic capacitance between the pixel electrode and the signal line and affects a difference in an effective value (Vd) of pixel potential of the pixel electrode 6. The display device substrate as set forth in claim 1, wherein
   the interlayer insulating film comprises a stacking body,
   the stacking body comprising an upper interlayer insulating film and a lower interlayer insulating film.

7. The display device substrate as set forth in claim 1, wherein the interlayer insulating film is made of acrylic transparent resin having a dielectric constant of about 3.7.

8. The display device substrate as set forth in claim 1, wherein the interlayer insulating film has a thickness of about 2.5 μm.

9. The display device substrate as set forth in claim 1, wherein the pixel electrodes of the substrate are driven by a dot reversal driving system.

10. The display device substrate as set forth in claim 1, further comprising an active device associated with each pixel electrode, the active device having a gate electrode and at least part of a source electrode, the pixel electrode being formed over a gate electrode and at least part of a source electrode of its associated active device.

11. A liquid crystal display device, comprising the display device substrate as set forth in claim 1.

12. The display device substrate as set forth in claim 1, wherein the gap between the signal line and the pixel electrode is not less than 1 μm and not more than a value at which display unevenness is not sufficiently improved relative to aperture ratio.

13. The display device substrate as set forth in claim 1, wherein a size of the gap between the signal line and the pixel electrode is set to provide a desired ΔΔβ value which is interrelated with display unevenness;
   wherein the desired ΔΔβ value is not more than 0.08; and
   wherein the desired ΔΔβ value is related to a difference in parasitic capacitance between the pixel electrode and the signal line and affects a difference in an effective value (Vd) of pixel potential of the pixel electrode.

* * * * *